(12) United States Patent
Nagata

(10) Patent No.: US 7,359,961 B2
(45) Date of Patent: Apr. 15, 2008

(54) SERVICE MANAGEMENT METHOD, SERVICE MANAGEMENT PROGRAM, AND INFORMATION RECORDING MEDIUM RECORDING THE PROGRAM

(75) Inventor: Masaya Nagata, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 1502 days.

(21) Appl. No.: 10/022,916

(22) Filed: Dec. 20, 2001

(65) Prior Publication Data

US 2002/0083165 A1    Jun. 27, 2002

(30) Foreign Application Priority Data

Dec. 27, 2000  (JP)  ............... 2000-399557

(51) Int. Cl.
  *G06F 15/173*  (2006.01)
(52) U.S. Cl. ............ 709/223; 715/705; 715/707; 715/709; 715/711; 715/713
(58) Field of Classification Search ......... 709/223, 709/224, 202; 715/715, 708, 705, 707, 709, 715/711, 713
See application file for complete search history.

(56) References Cited

U.S. PATENT DOCUMENTS

| | | | | |
|---|---|---|---|---|
| 5,388,198 A | * | 2/1995 | Layman et al. | 715/812 |
| 5,774,118 A | * | 6/1998 | Hatakama | 715/707 |
| 5,907,706 A | * | 5/1999 | Brodsky et al. | 717/105 |
| 6,167,358 A | * | 12/2000 | Othmer et al. | 702/188 |
| 6,262,730 B1 | * | 7/2001 | Horvitz et al. | 715/707 |
| 6,647,363 B2 | * | 11/2003 | Claassen | 704/1 |
| 6,662,225 B1 | * | 12/2003 | Motoyama et al. | 709/224 |
| 7,047,498 B2 | * | 5/2006 | Lui et al. | 715/762 |

FOREIGN PATENT DOCUMENTS

| | | |
|---|---|---|
| JP | 2-181253 A | 7/1990 |
| JP | 4-205410 A | 7/1992 |
| JP | 08-166945 | 6/1996 |
| JP | 10-232731 A | 2/1998 |
| JP | 2003-216461 | 7/2003 |

OTHER PUBLICATIONS

Shuji Morisaki, "Sharing Usage Knowledge for Application Software Using Function Execution History," Information Processing Journal, Information Processing Society Corporation, Oct. 15, 2000, vol. 41, No. 10, pp. 2770-2781.

* cited by examiner

*Primary Examiner*—Larry D. Donaghue
*Assistant Examiner*—Asghar Bilgrami
(74) *Attorney, Agent, or Firm*—Birch, Stewart, Kolasch & Birch, LLP

(57) ABSTRACT

A service management method of the present invention is provided so as to enable a service provider to easily obtain information on a user's usage conditions after the sales of a software package, and to provide the user with service to give him a chance and motivation to use a function which is available in the software package but is seldom used. To attain these objects, the service management method of the present invention includes a step for preparing a file showing usage conditions of a plurality of functions constituting the software package, a step for detecting that a function is selected or performed, and a step for updating the file so as to distinguish the detected function from an undetected function.

9 Claims, 23 Drawing Sheets

FIG. 10

| FUNCTION NAME | | | FUNCTION CODE | USAGE CONDITION | USAGE CONDITION DATA |
|---|---|---|---|---|---|
| HIGH | MIDDLE | LOW | | | |
| FILE | — | | 100 | NO | 0 |
| | SAVE IN HTML | | 111 | NO | 0 |
| | PRINT PREVIEW | | 121 | NO | 0 |
| | PRINT RANGE | — | 130 | NO | 0 |
| | | SET | 131 | NO | 0 |
| | | CLEAR | 132 | NO | 0 |
| | ... | ... | ... | ... | ... |
| EDIT | — | | 200 | NO | 0 |
| | UNDO | | 211 | NO | 0 |
| | REPEAT | | 221 | NO | 0 |
| | CUT | | 231 | NO | 0 |
| | COPY | | 241 | NO | 0 |
| | PASTE | | 251 | NO | 0 |
| | SELECT TYPE AND PASTE | | 261 | NO | 0 |
| | REPLACE | | 271 | NO | 0 |
| | SEARCH | | 281 | NO | 0 |
| | ... | ... | ... | ... | ... |
| VIEW | — | | 300 | NO | 0 |
| | TOOL BAR | — | 310 | NO | 0 |
| | | STANDARD | 311 | NO | 0 |
| | | LAYOUT | 312 | NO | 0 |
| | | GRAPHIC | 313 | NO | 0 |
| | ... | ... | ... | ... | ... |
| INSERT | — | | 400 | NO | 0 |
| ... | | | | | |

FIG. 11

| FUNCTION NAME | | | FUNCTION CODE | USAGE CONDITION | USAGE CONDITION DATA |
|---|---|---|---|---|---|
| HIGH | MIDDLE | LOW | | | |
| FILE | — | | 100 | NO | 0 |
| | SAVE IN HTML | | 111 | NO | 0 |
| | PRINT PREVIEW | | 121 | YES | 1 |
| | PRINT RANGE | — | 130 | NO | 0 |
| | | SET | 131 | NO | 0 |
| | | CLEAR | 132 | NO | 0 |
| | ... | ... | ... | ... | ... |
| EDIT | — | | 200 | NO | 0 |
| | UNDO | | 211 | NO | 0 |
| | REPEAT | | 221 | NO | 0 |
| | CUT | | 231 | NO | 0 |
| | COPY | | 241 | NO | 0 |
| | PASTE | | 251 | NO | 0 |
| | SELECT TYPE AND PASTE | | 261 | NO | 0 |
| | REPLACE | | 271 | NO | 0 |
| | SEARCH | | 281 | NO | 0 |
| | ... | ... | ... | ... | ... |
| VIEW | — | | 300 | NO | 0 |
| | TOOL BAR | — | 310 | NO | 0 |
| | | STANDARD | 311 | NO | 0 |
| | | LAYOUT | 312 | NO | 0 |
| | | GRAPHIC | 313 | NO | 0 |
| | ... | ... | ... | ... | ... |
| INSERT | — | | 400 | NO | 0 |
| ... | | | | | |

FIG. 12

| FUNCTION NAME | | | FUNCTION CODE | USAGE CONDITION | USAGE CONDITION DATA |
|---|---|---|---|---|---|
| HIGH | MIDDLE | LOW | | | |
| FILE | — | | 100 | NO | 0 |
| | SAVE IN HTML | | 111 | NO | 0 |
| | PRINT PREVIEW | | 121 | YES | 1 |
| | PRINT RANGE | — | 130 | NO | 0 |
| | | SET | 131 | NO | 0 |
| | | CLEAR | 132 | NO | 0 |
| | ... | ... | ... | ... | ... |
| EDIT | — | | 200 | YES | 1 |
| | UNDO | | 211 | YES | 1 |
| | REPEAT | | 221 | YES | 1 |
| | CUT | | 231 | YES | 1 |
| | COPY | | 241 | YES | 1 |
| | PASTE | | 251 | YES | 1 |
| | SELECT TYPE AND PASTE | | 261 | YES | 1 |
| | REPLACE | | 271 | YES | 1 |
| | SEARCH | | 281 | YES | 1 |
| | ... | ... | ... | ... | ... |
| VIEW | — | | 300 | NO | 0 |
| | TOOL BAR | — | 310 | NO | 0 |
| | | STANDARD | 311 | NO | 0 |
| | | LAYOUT | 312 | NO | 0 |
| | | GRAPHIC | 313 | NO | 0 |
| | ... | ... | ... | ... | ... |
| INSERT | — | | 400 | YES | 1 |
| ... | | | | | |

FIG. 13

| FUNCTION NAME | CODE |
|---|---|
| FILE | 100 |
| SAVE IN HTML | 111 |
| PRINT PREVIEW | 121 |
| PRINT RANGE | 130 |
| SET | 131 |
| CLEAR | 132 |
| EDIT | 200 |
| UNDO | 211 |
| REPEAT | 221 |
| CUT | 231 |
| COPY | 241 |
| PASTE | 251 |
| SELECT TYPE AND PASTE | 261 |
| REPLACE | 271 |
| SEARCH | 281 |
| VIEW | 300 |
| TOOL BAR | 310 |
| SANDARD | 311 |
| LAYOUT | 312 |
| GRAPHIC | 313 |
| INSERT | 400 |
| ... | 411 |

| FUNCTION CODE | ACTION NAME | CONTENT |
|---|---|---|
| 100 | A100 | TRANSMIT THE CONTENT OF FILE 100. |
| 111 | A110 | TRANSMIT THE CONTENT OF FILE 110. |
| 121 | A121 | TRANSMIT THE CONTENT OF FILE 120. |
| 130 | A130 | TRANSMIT THE CONTENT OF FILE 130. |
| 131 | A131 | TRANSMIT THE CONTENT OF FILE 131. |
| 132 | A132 | TRANSMIT THE CONTENT OF FILE 132. |
| 200 | A200 | TRANSMIT THE CONTENT OF FILE 200. |
| 211 | A211 | TRANSMIT THE CONTENT OF FILE 211. |
| 221 | A221 | TRANSMIT THE CONTENT OF FILE 221. |
| 231 | A231 | TRANSMIT THE CONTENT OF FILE 231. |
| 241 | A231 | TRANSMIT THE CONTENT OF FILE 231. |
| 251 | A251 | TRANSMIT THE CONTENT OF FILE 251. |
| 261 | A261 | TRANSMIT THE CONTENT OF FILE 261. |
| 271 | A271 | TRANSMIT THE CONTENT OF FILE 271. |
| 281 | A281 | TRANSMIT THE CONTENT OF FILE 281. |
| 300 | A300 | TRANSMIT THE CONTENT OF FILE 300. |
| 310 | A310 | TRANSMIT THE CONTENT OF FILE 310. |
| 311 | A311 | TRANSMIT THE CONTENT OF FILE 311. |
| 312 | A312 | TRANSMIT THE CONTENT OF FILE 312. |
| 313 | A313 | TRANSMIT THE CONTENT OF FILE 313. |
| 400 | A400 | TRANSMIT THE CONTENT OF FILE 400. |
| 411 | A411 | TRANSMIT THE CONTENT OF FILE 411. |

FIG. 14 (a)

FILE 110
"SAVE IN HTML IS NOT USED."

FIG. 14 (b)

FILE 110
"SAVE IN HTML IS NOT USED."
"SEE PAGE ... IN THE MANUAL TO KNOW HOW TO USE SAVE IN HTML."

FIG. 14 (c)

FILE 110
"SAVE IN HTML IS NOT USED."
"SEE PAGE ... IN THE MANUAL TO KNOW HOW TO USE SAVE IN HTML."
"IF YOU USE SAVE IN HTML, YOU CAN ...."

FIG. 14 (d)

FILE 110
"SAVE IN HTML IS NOT USED."
"SEE PAGE ... IN THE MANUAL TO KNOW HOW TO USE SAVE IN HTML."
"IF YOU USE SAVE IN HTML, YOU CAN ...."
GRAPHIC DATA G230

FIG. 19

| FUNCTION NAME | | | FUNCTION CODE | USAGE CONDITION | DATA ON NUMBER OF USAGE |
|---|---|---|---|---|---|
| HIGH | MIDDLE | LOW | | | |
| FILE | — | | 100 | NO | 0 |
| | SAVE IN HTML | | 111 | YES | 1 |
| | PRINT PREVIEW | | 121 | YES | 5 |
| | PRINT RANGE | — | 130 | NO | 0 |
| | | SET | 131 | NO | 0 |
| | | CLEAR | 132 | NO | 0 |
| | ... | ... | ... | ... | ... |
| EDIT | — | | 200 | YES | 1 |
| | UNDO | | 211 | YES | 100 |
| | REPEAT | | 221 | YES | 56 |
| | CUT | | 231 | YES | 251 |
| | COPY | | 241 | YES | 356 |
| | PASTE | | 251 | YES | 298 |
| | SELECT TYPE AND PASTE | | 261 | YES | 27 |
| | REPLACE | | 271 | YES | 13 |
| | SEARCH | | 281 | YES | 24 |
| | ... | ... | ... | ... | ... |
| VIEW | — | | 300 | NO | 0 |
| | TOOL BAR | — | 310 | NO | 0 |
| | | STANDARD | 311 | NO | 0 |
| | | LAYOUT | 312 | NO | 0 |
| | | GRAPHIC | 313 | NO | 0 |
| | ... | ... | ... | ... | ... |
| INSERT | — | | 400 | NO | 0 |
| ... | | | | | |

FIG. 20

| FUNCTION NAME | | | FUNCTION CODE | USAGE CONDITION | DATA ON NUMBER OF USAGE | SERVICE SUBJECT |
| --- | --- | --- | --- | --- | --- | --- |
| HIGH | MIDDLE | LOW | | | | |
| FILE | — | | 100 | NO | 0 | — |
| | SAVE IN HTML | | 111 | YES | 1 | 1 |
| | PRINT PREVIEW | | 121 | YES | 5 | 1 |
| | PRINT RANGE | — | 130 | NO | 0 | 1 |
| | | SET | 131 | NO | 0 | 1 |
| | | CLEAR | 132 | NO | 0 | 1 |
| | ... | ... | ... | ... | ... | ... |
| EDIT | — | | 200 | YES | 1 | — |
| | UNDO | | 211 | YES | 100 | 0 |
| | REPEAT | | 221 | YES | 56 | 0 |
| | CUT | | 231 | YES | 251 | 0 |
| | COPY | | 241 | YES | 356 | 0 |
| | PASTE | | 251 | YES | 298 | 0 |
| | SELECT TYPE AND PASTE | | 261 | YES | 27 | 1 |
| | REPLACE | | 271 | YES | 13 | 1 |
| | SEARCH | | 281 | YES | 37 | 0 |
| | ... | ... | ... | ... | ... | ... |
| VIEW | — | | 300 | NO | 0 | — |
| | TOOL BAR | — | 310 | NO | 0 | 1 |
| | | STANDARD | 311 | NO | 0 | 1 |
| | | LAYOUT | 312 | NO | 0 | 1 |
| | | GRAPHIC | 313 | NO | 0 | 1 |
| | ... | ... | ... | ... | ... | ... |
| INSERT | — | | 400 | NO | 0 | 1 |
| ... | | | | | | |

SERVICE MANAGEMENT METHOD, SERVICE MANAGEMENT PROGRAM, AND INFORMATION RECORDING MEDIUM RECORDING THE PROGRAM

FIELD OF THE INVENTION

The present invention relates to a service management method for obtaining information on usage conditions of available functions in a software package and proposing an active use of the available functions to a user according to the usage conditions, a program for executing the service management method, and an information recording medium recording the program.

BACKGROUND OF THE INVENTION

A software package sold by a manufacturer or a sales company has plenty of preprogrammed functions, and advantageous features serve as appeal points of the package at the time of sales. The appeal points are advertised via the media such as TV commercials, magazines, catalogs, etc., or explained by salespeople, and generally a user makes a decision which product to buy based on such information.

There are several methods for explaining functions available in a software package, such as (1) a method for displaying an explanation on a display, etc. when the software package is installed or activated, and (2) a method for preparing an explanation as a help function.

In the former method, an installing program or a activating program of the software package is programmed so as to automatically display the help file, etc., when the software package is installed or activated. Information to be displayed is, as will be mentioned later, a part of the content prepared as a help file, or the content prepared separately.

In the latter method, the help function is prepared so as to quickly respond to a user's question. The function is provided so that, for example, when a user desires to know how to use a certain function, the user opens a help file and performs a keyword search, etc. as necessary so as to obtain desired information.

However, although a user takes various available functions into consideration when buying a product, it is general that the user uses only specific functions among the various functions. The user seldom uses all the available functions after the purchase, rather, functions not used would be more than functions used. Especially, after a certain period of time after the purchase, it can be said that most of the functions which have not been used will not be used.

Meanwhile, it is meaningful for a manufacturer to obtain information on usage conditions of functions provided to a product after the sales. That is, each of the functions is provided to a product for a certain purpose, but these functions, regarded as seeds, do not always fit the needs of users, and might result in being useless. Since considerable effort has been put into software development, and development cost and time have been allocated for providing functions to a product, it is required to take an action such that functions not favored by users are not adopted for the next model.

However, it is difficult for a manufacturer to obtain such information after the sales. Although the manufacturer can, for example, run a follow-up survey by setting out a questionnaire, positive cooperation from users is required in such a case. Since it depends on the intention of the users, it is difficult to obtain sufficient replies from the users.

Incidentally, as a method for obtaining positive cooperation from users, a campaign activity such as providing rewards or gifts can be carried out. However, it is very difficult to carry out such a campaign activity for all the products, in terms of cost. Further, an activity for informing the campaign activity itself is also difficult to be carried out and requires additional cost.

As described, on a user's side, while he tolerated to pay for available functions when he bought a product, he rarely uses the functions effectively after the purchase. In addition, on a manufacturer's side, it has been difficult to surely obtain information on how users use the functions effectively, so the manufacturer has been failing to propose the effective use of the functions to the users.

Further, the method for displaying a file explaining functions of a software package when the software package is installed or activated is provided for giving a general explanation of the functions, and thus it is not provided for explaining only specific functions for a certain purpose by displaying the explanation of the specific functions at a specific period of time. Besides, since a user can decide whether or not to display the explanation, the explanation is not automatically displayed unless requested by the user. Moreover, the explanation is not displayed after the software package is installed, unless it is set to be displayed every time when an application program is activated. Also in this case, the explanation to be displayed is identical every time, and it is not arranged to change according to the usage conditions of the user.

Besides, the method for preparing an explanation as the help function is also a passive method, with its use completely left to the intention of the user, and is never used unless the user takes an action to use it.

In this manner, the user does not notice that the software package he uses has useful functions, and the manufacturer cannot obtain information on whether respective functions provided to the software package are actually of utility value or not. Therefore, the manufacturer fails to effectively provide users with functions having utility value for the users.

SUMMARY OF THE INVENTION

It is therefore an object of the present invention to provide a service management method for checking usage conditions of a plurality of functions provided to a software package used by a user, and for providing the user with service for promoting the use of a function which is seldom used, and allowing a manufacturer to perform software planning and development and to make a suggestion to the user according to the user's usage conditions; a program for executing the service management method; and an information recording medium recording the program.

In order to accomplish the object, a service management method of the present invention, which is a service management method managing an application program made up of a combination of a plurality of functions by a computer, is structured so as to include the steps of checking usage conditions of the plurality of the functions, and making the computer carry out notification and promotion processing to promote a user to use a function which is used less than a predetermined number of times.

In the foregoing structure, a function means an operation using a computer in which a predetermined processing result can be obtained by operating the computer in accordance with a program. The application program made up of a plurality of such functions can make the computer carry out a plurality of operations, but the plurality of the functions are not used equally by a user: some functions are used often, and some functions are seldom used.

Consequently, according to the present invention, usage conditions of the plurality of the functions are checked so as to find out a function which is used seldom, less than a predetermined number of times, and notification and promotion processing for promoting the use of the function is carried out. The notification and promotion processing is processing to notify the user of the utility value of a seldom used function and to motivate the user to try to use the function. The processing is provided to inform the user of, for example, the presence of a seldom used function, brief information what the seldom used function can do, and how to use the seldom used function, etc.

Besides, examples of a notification method include displaying a message promoting the use of a function on a screen which displays processing of a software package of the application program, printing out the message on a sheet of paper, etc., and announcing the message by machine voice from a device using the software package, etc.

Consequently, it is possible to motivate the user to use a function which the user does not notice and seldom uses, and thus the user becomes aware of a useful function incorporated into the application program the user uses. Therefore, it becomes possible to effectively provide the user with a function having high utility value for the user.

In addition, in order to accomplish the object, the service management method of the present invention, which is a service management method managing an application program made up of a combination of a plurality of functions by a computer, is structured so as to include the steps of checking usage conditions of the plurality of the functions and making the computer carry out processing to transmit the checking result to a service provider providing the application program to a user.

According to the foregoing structure, the result of checking the usage conditions of the functions of the application program is transmitted to the service provider. Thus, the service provider (manufacturer) can obtain information on which function has already been used and which function has never or seldom been used. As a result, the service provider can take more flexible measures according to the actual usage conditions.

That is, for example, the service provider can provide the service receiver (user) using the application program with service such as transmitting a message promoting the use of a function via a network, etc., based on the obtained information on the usage conditions. In addition, for example, the service provider can judge a seldom used function as having less actual utility value for users, and when planning a next version of the software package of the application program, the service provider can take measures for seeking the direction in planning and development, such as examining whether to delete the function to avoid bloating and cost increase of the software package, or improve the function to be easier to use.

Consequently, it becomes possible to provide the user with a function having high utility value for the user more effectively.

For a fuller understanding of the nature and advantages of the invention, reference should be made to the ensuing detailed description taken in conjunction with the accompanying drawings.

BRIEF DESCRIPTION OF THE DRAWINGS

FIG. 10 is an explanatory view showing an example of a function table of the present invention.

FIG. 11 is an explanatory view showing another example of the function table of the present invention.

FIG. 12 is an explanatory view showing an example of the function table (when service is applied) of the present invention.

FIG. 13 is an explanatory view showing an example of an action table of the present invention.

FIGS. 14($a$) through 14($d$) are explanatory views showing examples of a file showing the content of the action to be taken.

FIG. 19 is an explanatory view showing another example of the function table of the present invention.

FIG. 20 is an explanatory view showing still another example of the function table of the present invention.

DESCRIPTION OF THE PREFERRED EMBODIMENTS

First Embodiment

Referring to FIGS. 1 through 18, the following description will describe an embodiment of the present invention.

Network Configuration

Figure 3:
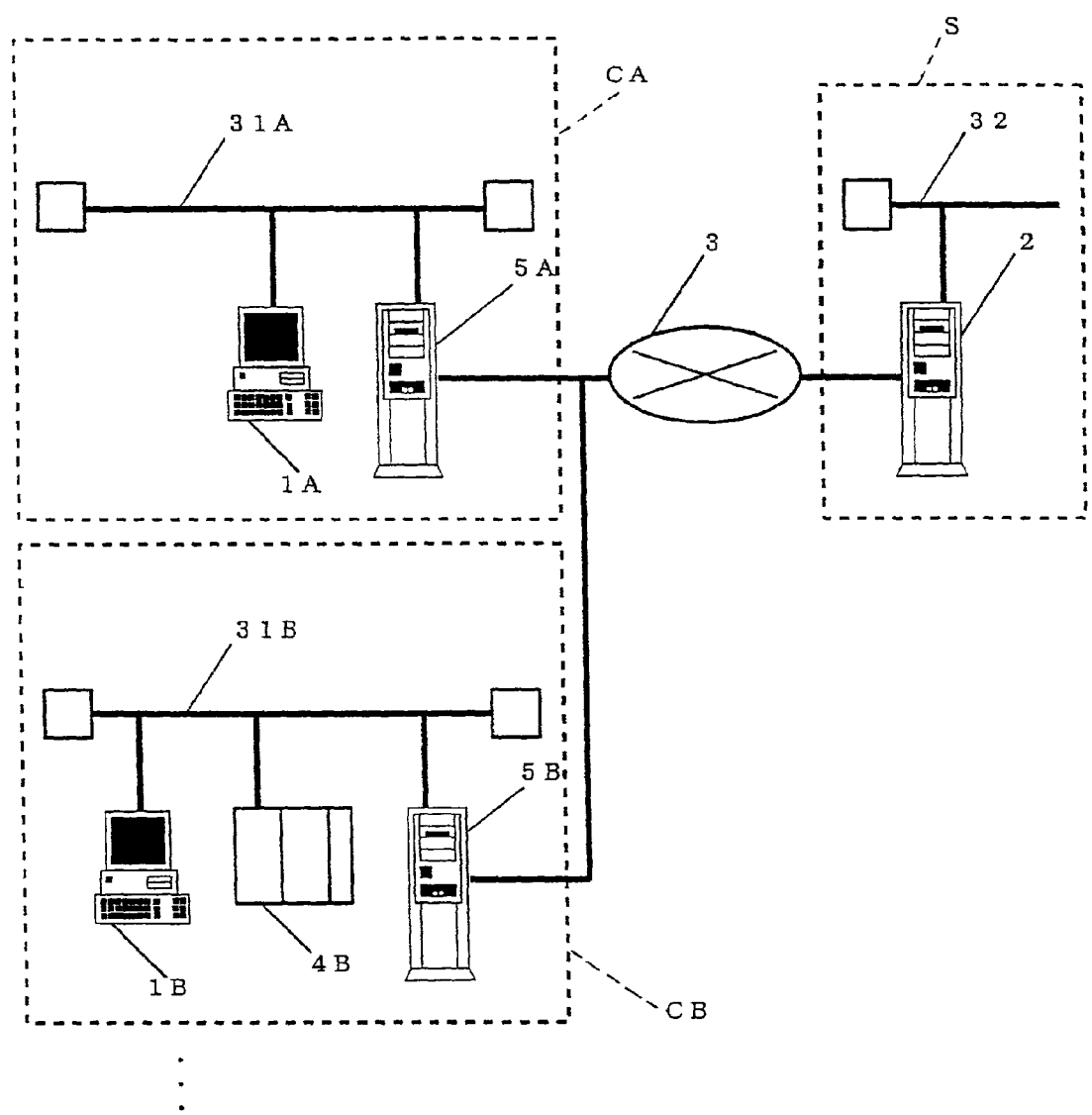
FIG. 3 is an explanatory view showing the overall service management network system of the present invention.

FIG. 3 is a schematic view of a network configuration to which the present invention is applied. As shown in FIG. 3, client machines 1 (1A, 1B, . . . ) of a plurality of service receivers C (CA, CB, . . . ) are connected to a terminal 2 of a service provider S via a network 3.

In this example, the system of a service receiver CA is structured by a personal computer 1A, a network 31A in the system of the service receiver CA, and a server 5A which supports the network 31A and intermediates the connection with the external network 3. The personal computer 1A is the client machine 1 in which a software package (an application program) managed by a service management method of the present invention is installed.

Besides, in this example, the system of a service receiver CB is structured by a production device 4B, a personal computer 1B which controls the production device 4B, a network 31B in the system of the service receiver CB, and a server 5B which supports the network 31B and intermediates the connection with the external network 3. The personal computer 1B is the client machine 1 in which the software package (the application program) managed by the service management method of the present invention is installed.

Incidentally, the service receiver C receiving service from the service provider S does not have to be plural, but may be single. Besides, the servers 5A, 5B, . . . in the system of the service receiver C are not necessarily required.

Device Configuration

Figure 1:
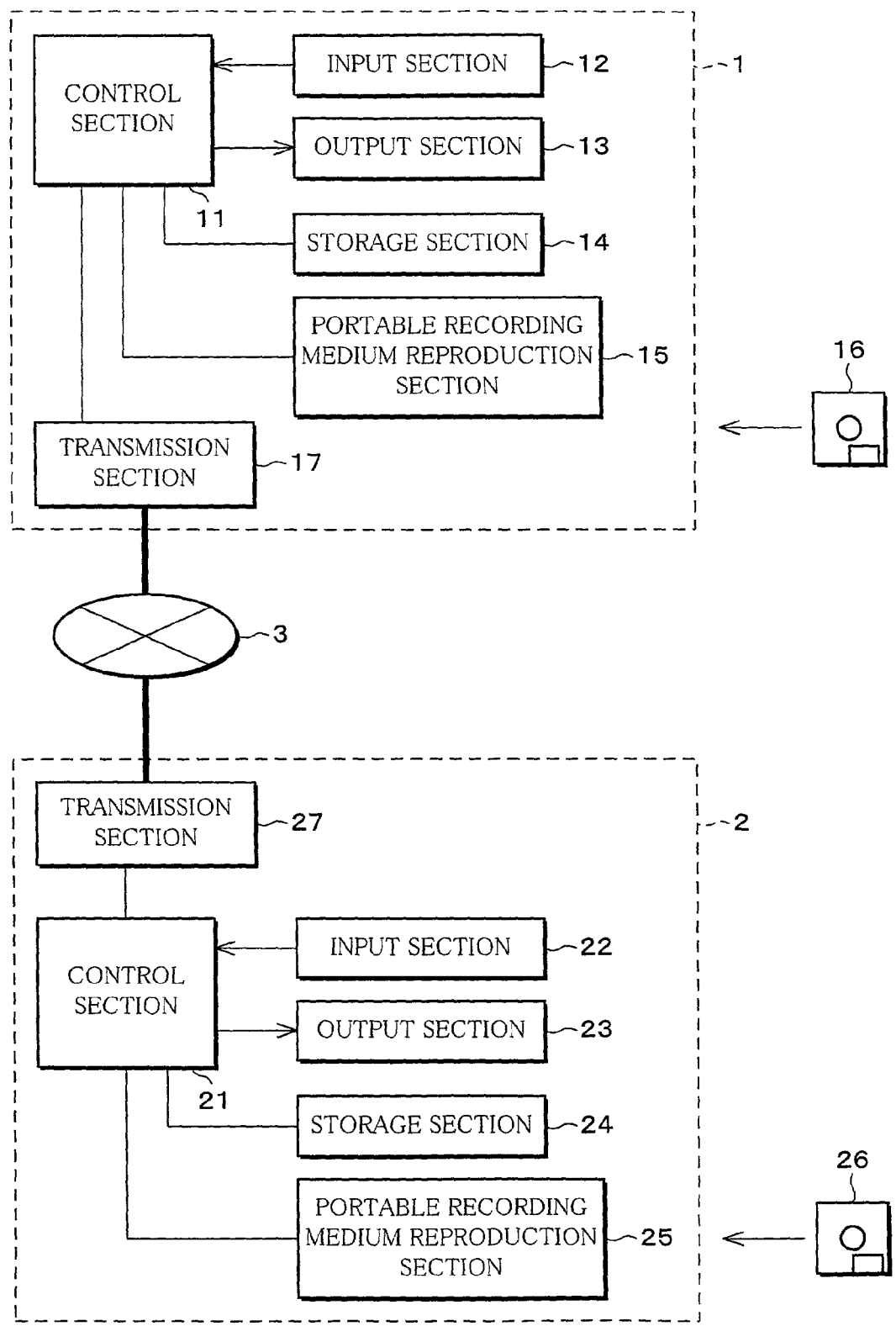
FIG. 1 is a schematic view showing a service management network system of the present invention.

FIG. 1 is a structural view showing an overall system configuration of the present invention, between a specific service receiver C and the service provider S. In FIG. 1, the client machine 1 is connected to the terminal 2 of the service provider S via the network 3 such as a telephone line. Examples of the client machine 1 include a workstation (WS) and a personal computer (PC), etc. The client machine 1 includes a control section 11, which is the main unit; an input section 12 such as a keyboard, a touch panel, a mouse, a track ball, etc.; an output section 13 such as a CRT, a liquid crystal display, a printer, etc.; a storage section 14 such as a hard disk, etc.; a portable recording medium reproduction section 15 driving a portable recording medium 16 such as a floppy disk (FD) and an optical disk, etc.; and a transmission section 17.

The following description will explain each section. The control section 11 is the section for performing computations in accordance with information inputted from the transmission section 17 or the input section 12, and examples of the control section 11 include a CPU and a memory. More specifically, the control section 11 monitors a signal from the input section 12 such as a mouse, a keyboard, etc, generates a predetermined instruction according to the signal, and updates the content of the storage section 14 when a function of a software package is performed for the first time during the operation of the software package.

For example, when a function Print Preview is selected by a user with a function selection button which will be described later, in a state where a word processor software package is activated, the control section 11 invokes a predetermined algorithm for the Print Preview function so as to perform originally desired processing, and at the same time, the control section 11 checks a box for the Print Preview function in a function table (see FIG. 11) of a management file showing function usage conditions (hereinafter referred to as a management file) stored in the storage section 14. Although details will be described later, specifically, the control section 11 changes the value in a box for showing usage condition data, from "0" to "1".

Besides, the control section 11 gives a direction to the transmission section 17 to transmit information on functions unchecked in the function table, that is, information on functions which have "0" in their usage condition data boxes, to an external device as necessary. In an image forming device where a CPU is used for overall device control, the CPU can be used as the control section 11.

Examples of the memory constituting the control section 11 include a RAM (Random Access Memory) for temporarily storing a processing result. When computation processing is performed in a software manner, a nonvolatile memory for storing a program describing processing procedures should be prepared. Or, the program describing the processing procedures may also be stored in the storage section 14 which will be mentioned later, and read from the storage section 14 when the program is run for handling a task on the RAM.

Examples of the input section 12 include a keyboard, a mouse, a pointing device, etc., and it is used to select a function of the software package displayed on a screen of the output section 13 such as a CRT. The functions of the software package are displayed as buttons on a tool bar, and a function is performed by clicking one of the buttons.

The output section 13 is provided for soft copy and hard copy of information, and for the former purpose, a display such as a CRT or a liquid crystal display is applicable, and for the latter purpose, a printer is applicable. In the present invention, the output section 13 mainly denotes a display such as a CRT or a liquid crystal display.

The storage section 14 is a section for storing the information inputted from the transmission section 17 or the input section 12, and computation results performed by the control section 11, and examples of the storage section 14 include a hard disk. Examples of stored content include an application program of the software package managed by the service management method of the present invention, a program for making a computer execute the management method of the present invention (hereinafter referred to as a service management program of the present invention), the foregoing management file, etc. The stored information in the storage section 14 is updated when there is an instruction to do so by the control section 11. Incidentally, the storage section 14 corresponds to an information recording medium recording the service management program of the present invention.

The portable recording medium reproduction section 15 is a section to capture information recorded in the portable recording medium 16 to the client machine 1, or to take out data prepared by the client machine 1 to an external device. For the former purpose, reproduction-only optical disks such as a CD-ROM (Read Only Memory), a DVD (Digital Versatile Disk)-ROM, etc. are applicable, and for the latter purpose, optical disks such as a CD-R, a CD-RW, a DVD-RAM, etc., and magnetic disks such as a floppy disk (FD), a removable hard disk, etc. are applicable.

The service management program of the present invention is provided by the portable recording medium 16, and installed in the client machine 1 and stored in the storage section 14 by capturing the information of the service management program recorded in the portable recording medium 16 via the portable recording medium reproduction section 15. Therefore, the portable recording medium 16 is also an information recording medium recording the service management program of the present invention.

Incidentally, the service management program of the present invention may be structured to be downloaded via the transmission section 17 and installed in the client machine 1.

The transmission section 17 is a section for transmitting necessary information to the terminal 2 in accordance with information stored in the storage section 14, and examples of the transmission section 17 include a modem. Means for connection is not limited to a telephone line, and may include CATV (cable television), etc. It is needless to say that wireless transmission can be partly or entirely used for a connection between the transmission section 17 of the client machine 1 and a transmission section 27 of the terminal 2.

The terminal 2 provided on the side of the service provider S is basically structured identical to the client machine 1, and for example, a personal computer can be used as the terminal 2. The terminal 2 includes a control section 21, which is the main unit; an input section 22 such as a keyboard, a touch panel, a mouse, a track ball, etc.; an output section 23 such as a CRT, a liquid crystal display, a printer, etc.; a storage section 24 such as a hard disk, etc.; a portable recording medium reproduction section 25 driving a portable recording medium 26 such as a floppy disk (FD) and an optical disk, etc.; and the transmission section 27.

Figure 2:
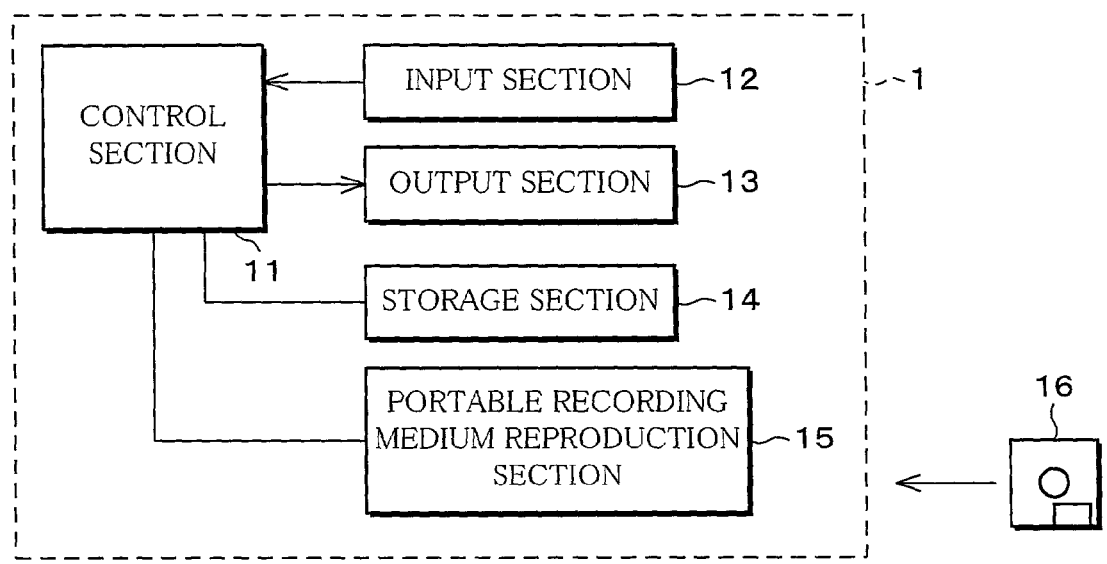
FIG. 2 is a functional block diagram of a client machine of the present invention.

FIG. 1 shows only one client machine 1, but it is possible to connect a plurality of the client machines 1 via the network 3. Besides, the service management method of the present invention can also be applied in the case where the client machine 1 is standalone, working without the network 3, as shown in FIG. 2.

The following description will explain each section. The control section 21 is the section for performing computations in accordance with the information inputted from the transmission section 27 or the input section 22, and examples of the control section 21 include a CPU and a memory. Examples of the memory include a RAM (Random Access Memory) for temporarily storing a processing result. When computation processing is performed in a software manner, a nonvolatile memory for storing a program describing processing procedures should be prepared. Or, the program describing processing procedures may also be stored in the storage section 24 which will be mentioned later, and read from the storage section 24 when the program is run for handling a task on the RAM.

Examples of the input section 22 include a keyboard, a mouse, a pointing device, an image scanner, a bar cord scanner, etc., and it is used to input information on the service to be provided, etc.

The output section 23 is provided for soft copy and hard copy of information, and for the former purpose, a display such as a CRT or a liquid crystal display is applicable, and for the latter purpose, a printer is applicable.

The storage section 24 is a section for storing information inputted from the transmission section 27 or the input section 22, and computation results performed by the control section 21, and examples of the storage section 24 include a hard disk. Examples of stored content include the service management program of the present invention, and an action table which will be described later. Incidentally, the storage section 24 corresponds to an information recording medium recording the service management program of the present invention.

The portable recording medium reproduction section 25 is a section to capture information recorded in the portable recording medium 26 to the terminal 2, or to take out data prepared by the terminal 2 to an external device. For the former purpose, reproduction-only optical disks such as a CD-ROM, a DVD-ROM, etc. are applicable, and for the latter purpose, optical disks such as a CD-R, a CD-RW, a DVD-RAM, etc., and magnetic disks such as a floppy disk (FD), a removable hard disk, etc. are applicable.

The service management program of the present invention is provided by the portable recording medium 26, and installed in the terminal 2 and stored in the storage section 24 by capturing the information of the service management program recorded in the portable recording medium 26 via the portable recording medium reproduction section 25. Therefore, the portable recording medium 26 is also an information recording medium recording the service management program of the present invention.

The transmission section 27 is a section for connecting to the network 3, and examples of the transmission section 27 include a modem when using a telephone line. The transmission section 27 may have a function for connecting to a local network, and in this case, the action table which will be described later may be provided not in the storage section 24, but in a database terminal (not shown) connected to the local network.

Figure 9:
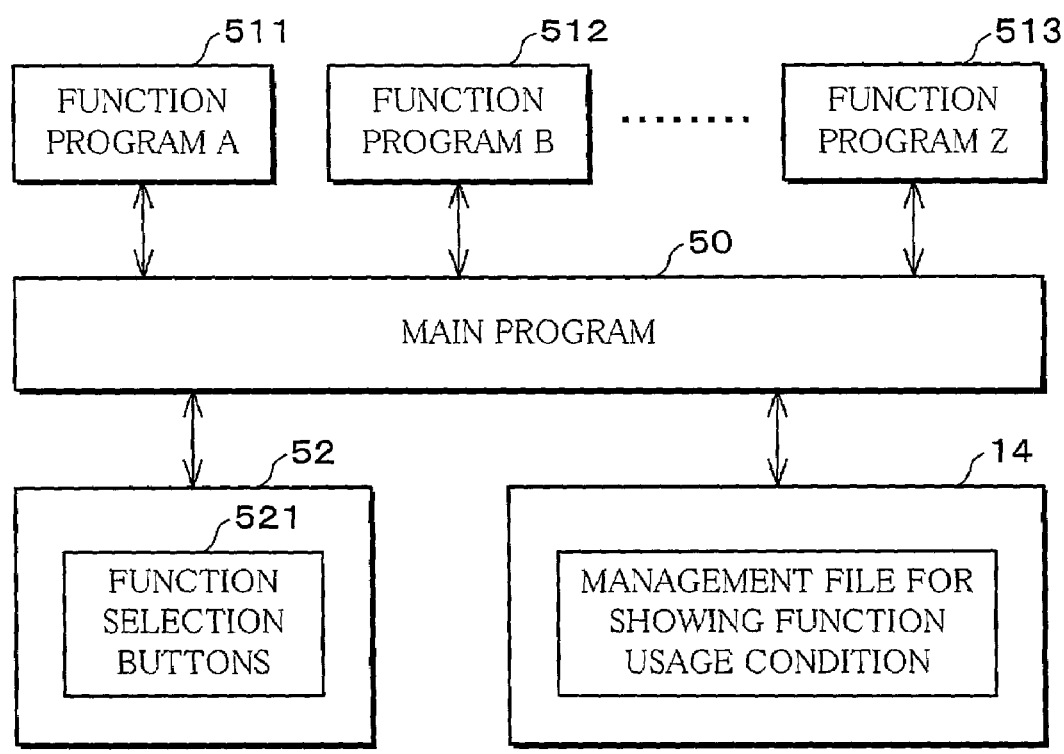
FIG. 9 is an explanatory view showing a software package by functional block.

FIG. 9 is a block diagram for further explaining the structure of the client machine 1. In FIG. 9, the software package (an application program of the software package) which is a subject of the service management of the present invention is installed in the client machine 1, and the software package is stored in the storage section 14 and executed by the control section 11. Examples of the software package include commercially available application software packages such as a word processor software package, a calculation software package, a drawing preparation software package, an image processing software package, an electronic mail software package, a browser, a game software package, a data base software package, etc. Or, the software package may be the one for controlling a measuring instrument, a manufacturing device, a processing device, etc., by a PC (personal computer).

Incidentally, the service management program of the present invention may be incorporated in the software package (for example, a word processor software package) which is the subject of the service management, as one function. Or, the service management program may be prepared separately from the subject software package, for each subject software package, and installed when the subject software package is installed. Besides, in a technique in which the service management program is prepared separately from the subject software package and installed together with the subject software package, the service management program may be prepared to be commonly used for a plurality of the subject software packages. Incidentally, in the following explanation, the explanation will be given assuming that the service management program of the present invention is incorporated in the subject software package as one function.

The service management program of the present invention is mainly structured by a main program 50 shown in FIG. 9. The main program 50 is structured to read out a plurality of function programs A (511) through Z (513) of the software package as necessary.

The plurality of the function programs A (511) through Z (513) may be described as incorporated into the main program 50, without a clear distinction between the function programs and the main program 50. In such a case, each of the plurality of the function programs A (511) through Z (513) is described as a lump in a part of the main program 50. Considering the easiness when modifying each of the function programs, or when adding or deleting the function program, such a module structure by function is preferable.

The main program 50 is a control program for performing main processing of the software package and providing overall control.

When a function is selected, a function program among the function programs A (511) through Z (513) which corresponds to the selected function is activated, or the control jumps to a place where the function program is described, so as to perform processing according to the selected function program. These respective functions can be performed in a software manner by the control section 11, and procedures for controlling to perform the functions are determined beforehand.

A display screen 52 is a part of a screen displayed on the output section 13 such as a liquid crystal display. Although respective screens displayed in the function programs A (511) through Z (513) are controlled by the respective functional programs A (511) through Z (513), function selection buttons 521 displayed on the output section 13 are basically displayed by the main program 50. However, in the case where a new window is displayed when the function programs A (511) through Z (513) are activated, a display screen of the window is provided by the function programs A (511) through Z (513).

The management file is recorded beforehand in the portable recording medium 16 along with the service management program of the present invention, and it is read out by the portable recording medium reproduction section 15 of the client machine 1 and prepared in the storage section 14 when the software package is installed, etc. The function table is stored in the management file, and the content of the function table is updated according to the usage conditions of the software package (the usage conditions of the respective functions).

More specifically, the management file is programmed so as to be automatically prepared when the software package is installed (assuming that the service management program of the present invention is incorporated in the subject software package as one function), or when the software package is used for the first time, etc. The management file in the storage section 14 is stored, for example, in a folder for the software package automatically prepared when the software package is installed. Besides, the management file may be stored with a file name such as service.xxx, in a folder which a user voluntarily designates and prepares in a place (directory path) other than the default folder, in order to change the place for storing the management file.

Here, xxx means an extension of a file. The extension may be the one specific to the software package, or may be the one which can be commonly used for another software package. Incidentally, such automatic preparation itself of the management file has been already available in automatically preparing such as a log file, a temporary file, etc., so it is not a new feature.

The function table stored in the management file shows a list of the functions of the subject software package, and one of its examples is shown in FIG. 10. FIG. 10 shows a table when the subject software package is a word processor software package, and the table includes functions such as Replace, Search, Font setting, etc.

The function table is classified and arranged hierarchically, having columns "High", "Middle", and "Low". For example, the "File" function further includes the "Save in HTML" function, the "Print Preview" function, and the "Print Range" function, and the "Print Range" function further includes the "Print Set" function and the "Clear" function.

In an initial state, "0" is indicated in all the usage condition data boxes in the function table. In the table, a function code is information specifying a function used when transmitting information of the function table via the transmission section 17. For example, to transmit information on the "Save in HTML" function, the information is transmitted with a function code "111". When receiving the function code "111", a function code receiving end interprets the function code as the information on the "Save in HTML" function. Therefore, it is necessary for the function code transmission end and receiving end to arrange such a correspondence between functions and corresponding function codes beforehand.

Next, the following description will describe notification and promotion processing for promoting a user to use a function available in a software package, in accordance with one embodiment of the present invention, in detail.

Process for Preparing and Updating the Management File

The following description will explain the case where an operator of the service receiver C uses a software package for the first time, and uses, for example, the Print Preview function, one of the functions which belong to the "File" function in the "High" column.

First, the operator of the service receiver C sets the portable recording medium 16 recording a software package (such as a word processor software package) which includes the service management program of the present invention to the portable recording medium reproduction section 15, so as to install the software package in the client machine 1. The software package is automatically installed by, for example, clicking a file "setup.exe". Here, in order to preclude illegal copy of the software package, a specific number given to each software package such as a product ID number is supposed to be inputted, and in the present embodiment, the ID number is used as information for identifying the service receiver C.

Besides, the software package installed from the portable recording medium 16 prepares the management file for monitoring the usage conditions of the functions available in the software package, in the storage section 14 of the client machine 1.

Figure 4:
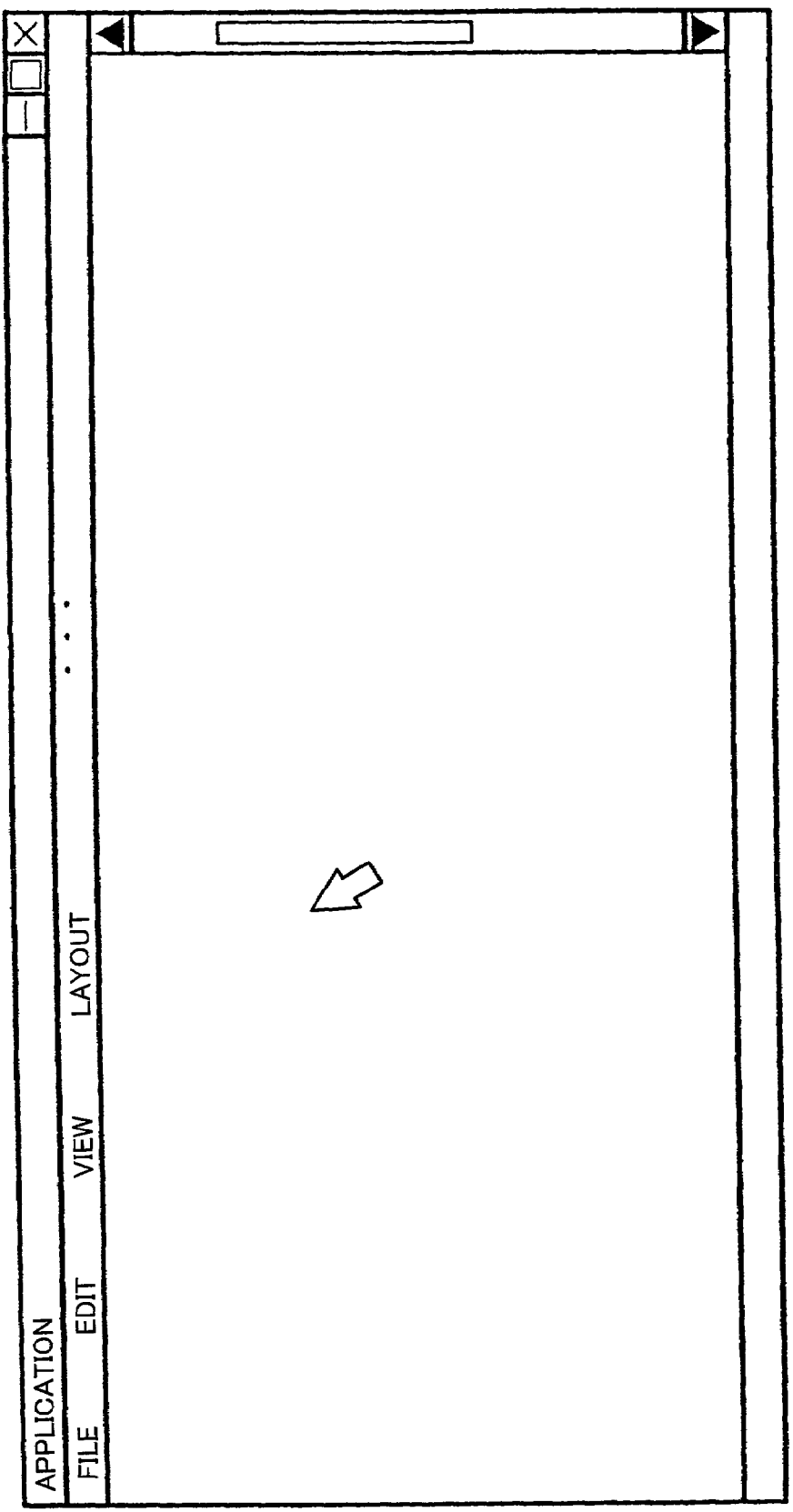
FIG. 4 is an explanatory view showing an example of a display screen of the present invention.

Next, when the operator of the service receiver C clicks the icon (not shown) for activating the software package, the main program 50 is activated, and a selection screen as shown in FIG. 4 is displayed on the output section 13 of the client machine 1. Here, FIG. 4 shows the selection screen when the software package is a word processor software package, and the content to be displayed on the selection screen may differ for each software package which is the subject of the service management.

Figure 5:
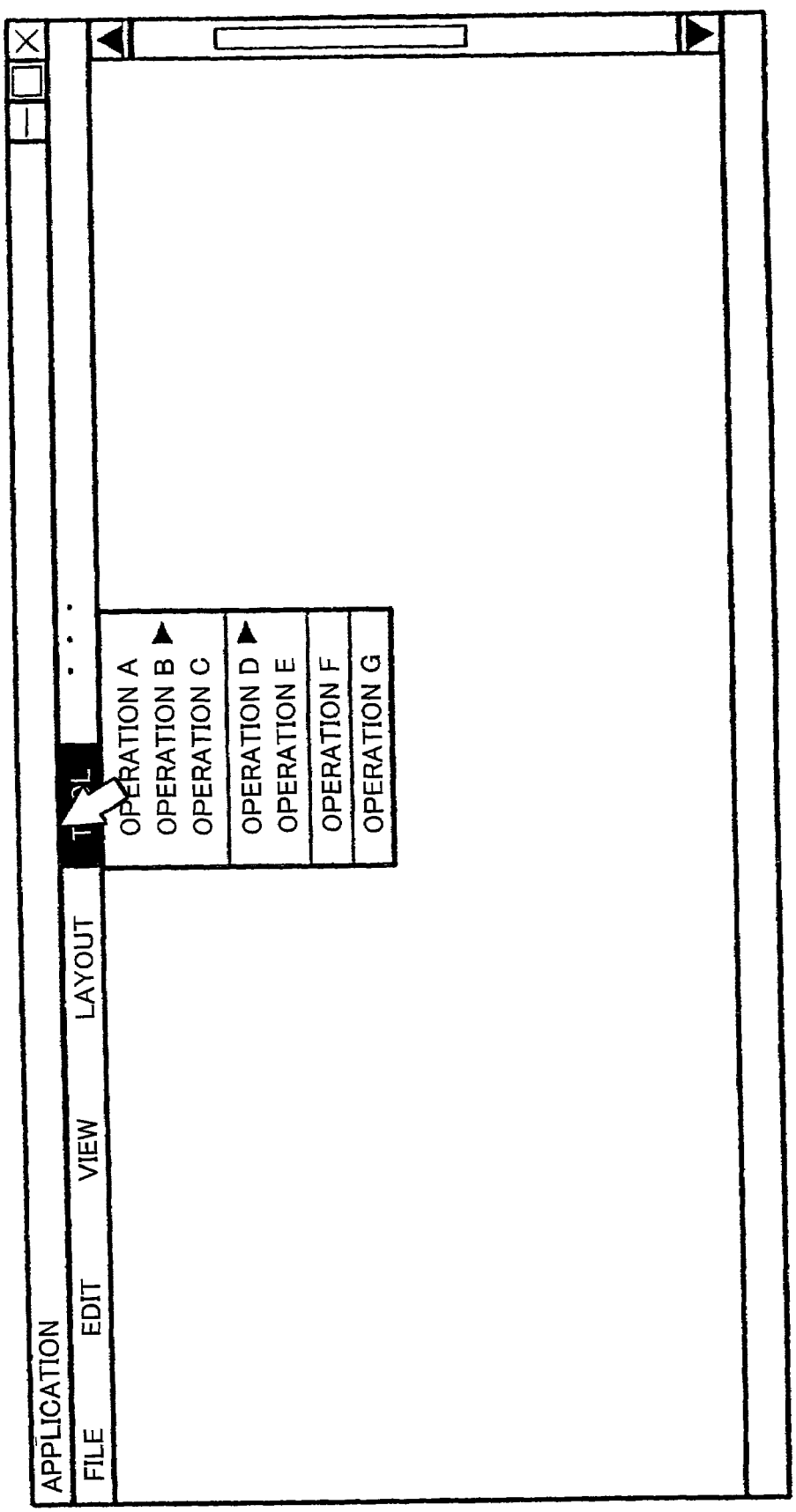
FIG. 5 is an explanatory view showing another example of a display screen (when a function selection button is selected) of the present invention.
Figure 6:
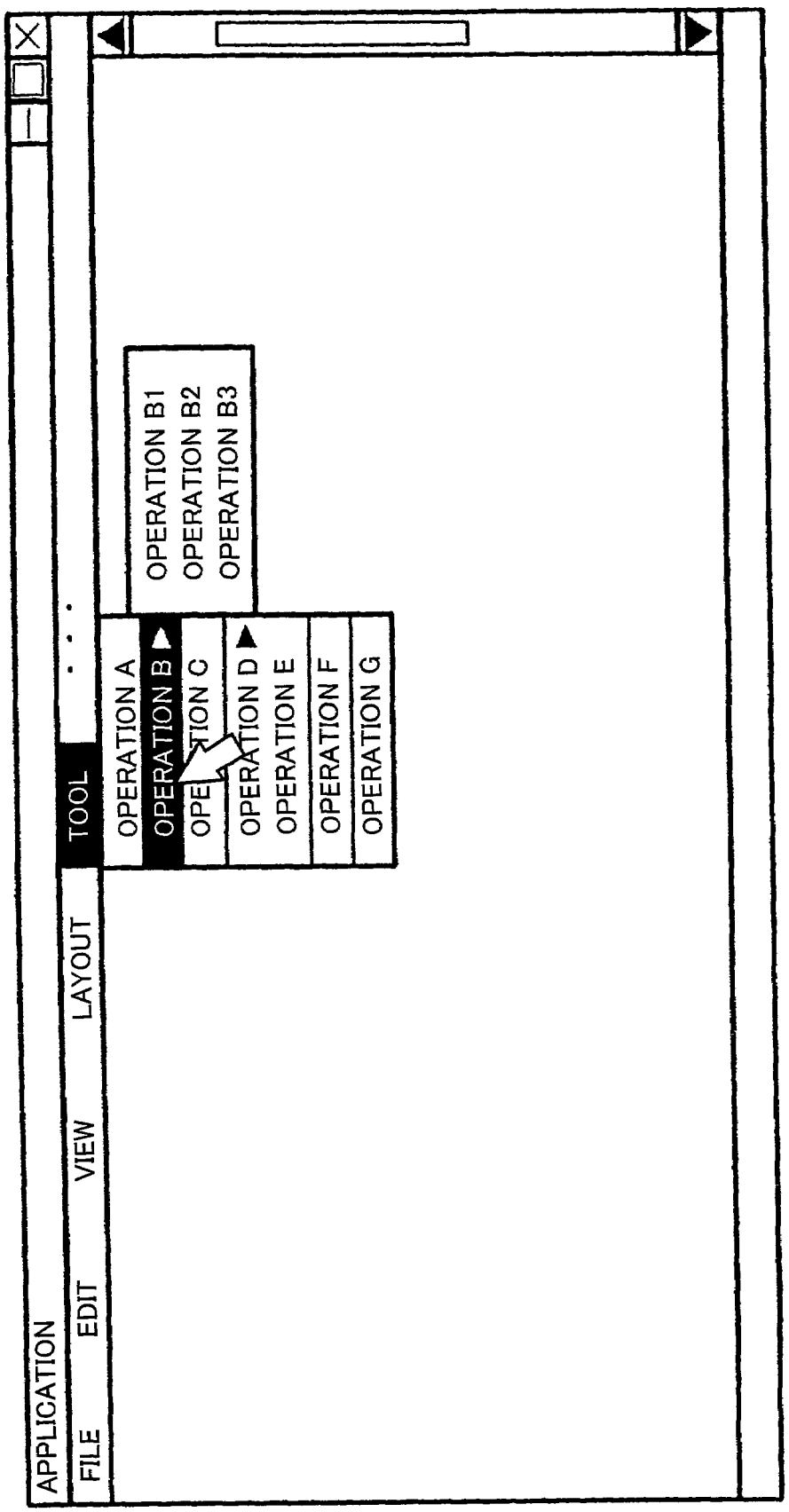
FIG. 6 is an explanatory view showing another example of a display screen (when a function selection button is selected) of the present invention.

The operator of the service receiver C selects a desired function among the function selection buttons displayed in a list display box on the selection screen. FIG. 5 shows an example that the Tool function is selected among the function selection buttons by locating the pointer at the position shown and clicking on the position. Incidentally, as shown in FIG. 6, some functions require more detailed function setting when they are selected. When the operator of the service receiver C selects the Print Preview function among the available functions, a signal informing the selection of the Print Preview function is inputted to the control section 11.

Next, the main program 50 refers to the function table, and activates a function program corresponding to the selected function, for example, the function program A (511), and performs processing for the function immediately or after waiting for the input by the operator of the service receiver C.

Here, taking the case where the software package is a word processor software package as an example, processing for simple functions such as "Cut", "Copy", "Paste", etc., can be performed by almost one-click operation.

Figure 7:
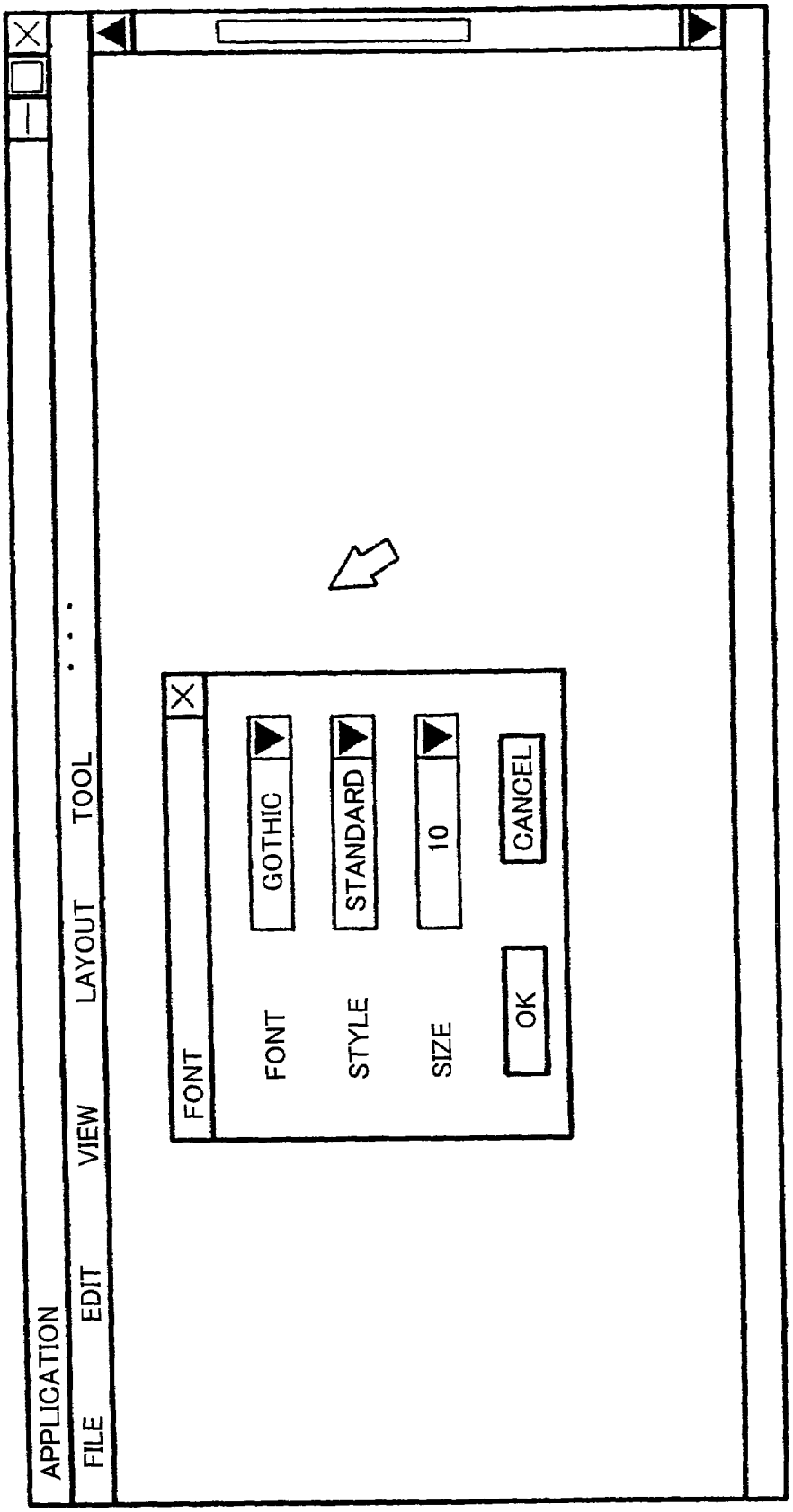
FIG. 7 is an explanatory view showing an example of a display screen (when another window appears) of the present invention.
Figure 8:
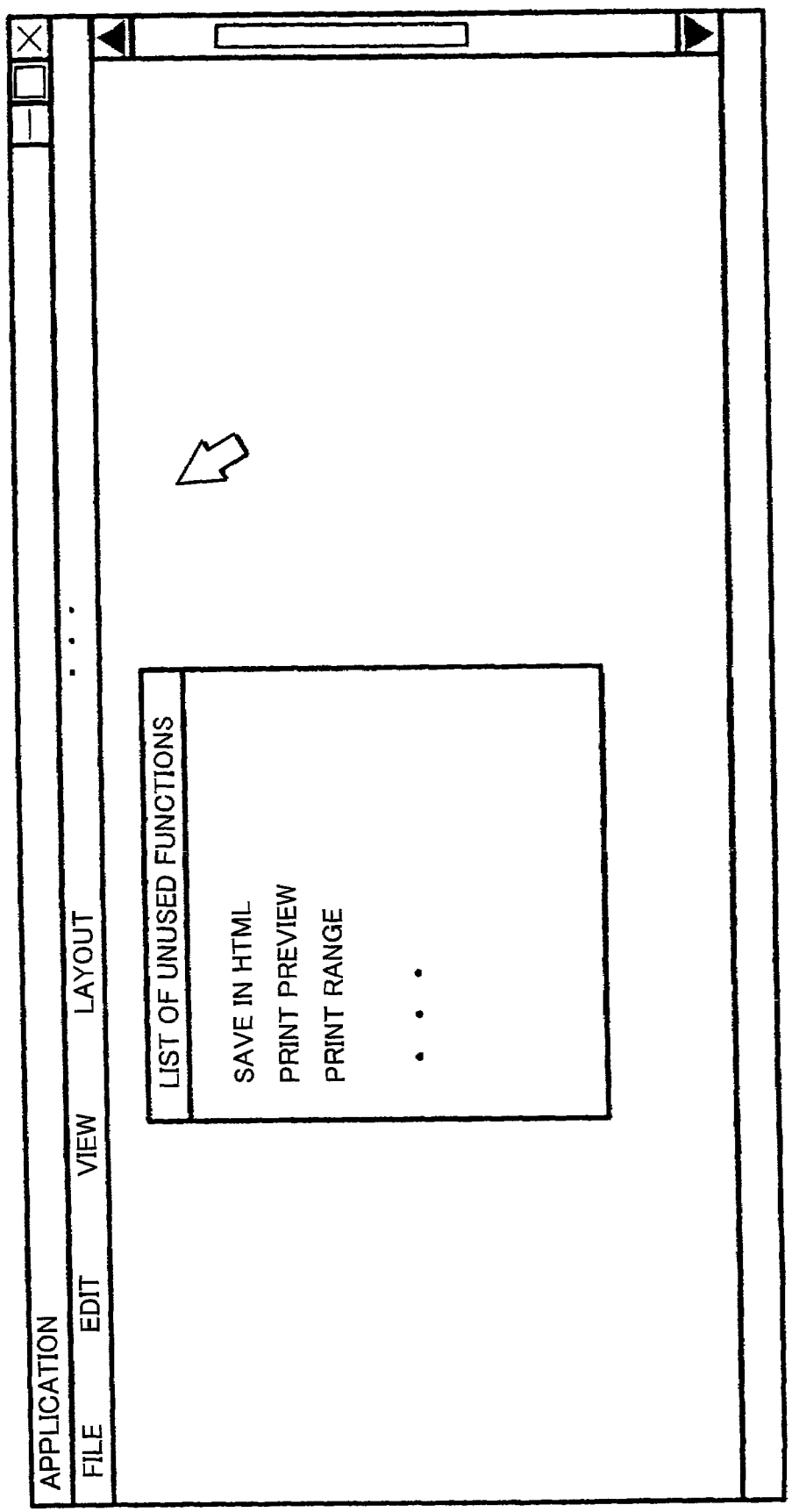
FIG. 8 is an explanatory view showing an example of a display screen (when a service screen appears) of the present invention.

However, there are some functions, as the Font Setting function, for which a setting screen for font setting is displayed in another window. In such a case, as shown in FIG. 7, an input screen for making a modification, change, check, etc. appears. The operator of the service receiver C changes a selected value in an input box and clicks the OK button, then each information for font setting is updated. If the operator of the service receiver C does not desire to change the setting, he can click the Cancel button to cancel the processing without updating each information for font setting.

When another window is displayed when selecting a function selection button, the main program 50 detects a click of the OK button on the input screen of the window and judges that the function is used.

Besides, there are some cases where the main program 50 judges that a function is used when a function selection button is clicked. Such judgment is made for functions such as the "Copy" function, for which processing is performed by almost one-click operation, without an appearance of another window.

However, as mentioned above, when it is requested to confirm whether to perform processing or not, as most of the cases where another window appears, there are not a few cases where the processing is not actually performed and is cancelled. These cases where the processing is cancelled include a case where an operator clicks a function selection button with a definite intention to use the function but fails to update information, and a case where an operator clicks a function selection button by mistake and cancels the following processing.

In the latter case, the function is not used actually, so it is inappropriate to make a judgment to exclude the function from the service subjects of the notification and promotion processing which will be described later (the functions not used). Therefore, when it is requested to confirm whether to perform processing or not, it is preferable to adopt a method such that the main program 50 detects the click of the OK button and judges that the function is used based on the detection result.

As described, the main program 50 detects that a function selection button is directly clicked, or that the OK button is clicked, then makes a judgment that the function corresponding to the function selection button is used.

The control section 11 performs original processing in accordance with the performance of the function, and at the same time, checks a box for the Print Preview function in the function table of the management file stored in the storage section 14. FIG. 10 shows the function table before being checked, and FIG. 11 shows the function table after being checked. As shown in FIGS. 10 and 11, by being checked, the value in the usage condition data box for the Print Preview function is changed from "0" to "1". In the usage condition data boxes, the default value is set as "0", and when a function is used, "1" is inputted in the corresponding box. Either "0" or "1" is indicated in each of the usage condition data boxes, and basically, the values have a irreversible property that "0" changes to "1", but "1" does not change to "0".

The following description will explain the rule when checking the boxes.

As mentioned before, the function table is divided into several levels, and codes such as 100, 200, 300 are given to the functions on the highest level, codes such as 110, 120, 210, 220, 230 are given to the functions on the second highest level, and when there is a further lower level, codes such as 111, 112, 113 are prepared for the functions on the lower level (see FIG. 10).

As shown in FIG. 12, when "1" is indicated in all the usage condition data boxes for functions on the lower level, "1" is inputted in the usage condition data box for a function on the level higher than that of these functions. For example, in the case of the Edit function (code: 200), since "1" is indicated in all the usage condition data boxes for the functions on the lower level, namely, "Undo" (code: 211), "Repeat" (code: 221), "Cut" (code: 231), . . . , "1" is also inputted in the usage condition data box for the Edit function (code: 200), which is the function on the level higher than that of these functions.

On the other hand, when "1" is not indicated in all the usage condition data boxes for the functions on the lower level, "0" remains in the usage condition data box for a function on the level higher than that of these functions. For example, in the case of the File function (code: 100), although "1" is indicated in the box for "Print Preview" (code: 121), "0" remains in the boxes for "Save in HTML" (code: 111) and "Print Range" (code: 130). Therefore, "0" remains in the box for the File function (code: 100), which is the function on the level higher than that of these functions.

The following description will explain advantages in updating the function table based on the above-mentioned rule.

When the control section 11 extracts the names of the functions which are not checked, the control section 11 performs the extraction from the functions on the higher level. Therefore, when "1" is indicated in the usage condition data box for a function on the higher level, it means that "1" is indicated in all the usage condition data boxes for the functions on the lower level which belong to the foregoing function. Thus, there is no need to further confirm whether the functions on the lower level have "1" or "0" in their boxes, reducing time for processing computation. In the example shown in FIG. 12, the indication on the Edit function (code: 200) represents such a case.

Besides, information to be transmitted to the terminal 2 is only that related to 200 as a function code, and its lower codes 211, 221, 231, . . . , do not have to be transmitted. Consequently, the amount of transmitted information can be reduced.

Next, when "0" is indicated in the usage condition data box for a function on the higher level, it means that at least one of the functions on the lower level has "0" in its usage condition data box. Consequently, first, it is required to search for a function on the next lower level which has "0" in its usage condition data box. Referring to FIG. 12 and giving an explanation on the File function (code: 100), "0" is indicated in the usage condition data box for the Print Range function (code: 130), which is on the next lower level than that of the File function.

Next, it is required to search for a function having "0" in its usage condition data box, on the further next lower level than that of the foregoing function having "0" in its box in the foregoing step. First, the Setting function (code: 131) does not have functions on its lower level, and the function itself is positioned on the lowest level. Thus, search on the code 131 is completed, and processing shifts to search on the Clear function (code: 132). The Clear function also does not have functions on its lower level, and the function itself is positioned on the lowest level. Thus, the search on the code 132 is also completed.

Here, whether there is a function on the further lower level or not is judged by whether the value of the lowest digit of the function code is "0" or not. That is, when there is a function on the lower level, the value of the lowest digit of a function code is set as "0", and when there is no function on the lower level, the value of the lowest digit of a function code is set to have a value except "0", such as 131, 132, etc. This rule is provided as the second rule.

In this manner, by making the rules as described above, the time for searching for a function having "0" in the usage condition data box can be shortened. Incidentally, the number of digits of the function code is not limited to the foregoing example.

FIG. 12 shows an example of the management file in a condition where a certain period of time has passed since the software package (here, the word processor software package) started to be used. The control section 11 transmits information on functions which have not been used, that is, functions having "0" in their usage condition data boxes in FIG. 12, from the transmission section 17 via the network 3 to the terminal 2. At this time, when the network 3 is not an exclusive line but a common line such as a telephone line, etc., information for identifying the information transmitting end is also transmitted. Here, the information for identifying the information transmitting end means a product ID number as mentioned above, or a user ID number which the service provider S provides to each service receiver C.

When Activating the Software Package on and after the Second Time

The explanation has been given on the case where a software package is installed and used for the first time. The following description will explain the operation of the software package on and after the second time.

When the operator of the service receiver C activates the software package again and uses a function in the software package, checks are made in the boxes for the function in the function table stored in the management file. Except when the software package is activated for the first time, the management file is already prepared and stored in the storage section 14. Consequently, when updating the management file, the operation starts with invoking the management file.

Here, when the storage place of the management file is specified by the software package and cannot be changed by the operator of the service receiver C, depending on the content when the software package is installed, the control section 11 searches for a file named, for example, "service-.xxx" among the files located in the storage place specified by the software package.

Incidentally, if the file is not detected in the search, the control section 11 is programmed to prepare the file, and informs the operator of the service receiver C, etc., that the file is not detected, by displaying a message such as "The management file showing the usage conditions of the functions cannot be found. Set the CD-ROM recording the application program and follow the instructions" on the display screen of the output section 13, and demands the preparation of the file to the operator of the service receiver C, etc.

On the other hand, when the storage place of the management file can be voluntarily changed by the operator of the service receiver C, the control section 11 is programmed to automatically prepare a file with information on the storage place recorded, and a directory path inputted by the operator of the service receiver C is stored in the file. By referring to the file, the control section 11 obtains directory path information, and searches the file "service.xxx" in the directory path.

In such a manner, the control section 11 acquires the information on the storage place of the management file, and obtains the function table stored in the file.

Next, the control section 11 checks the function used by the operator of the service receiver C this time in the management file. That is, the data "0" in the usage condition data box for the function in the function table is updated to "1".

Figure 15:
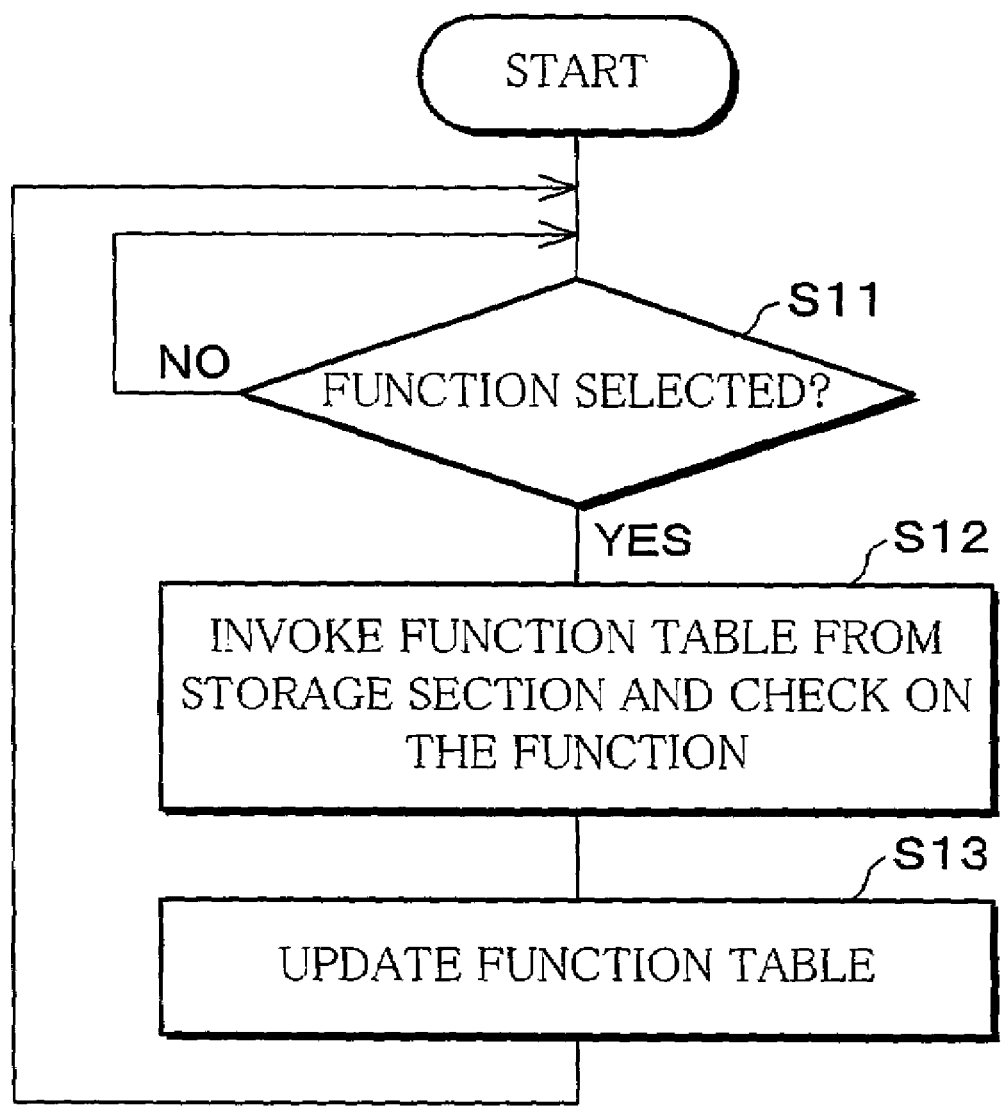
FIG. 15 is a flow chart showing a control by the client machine of the present invention.
Figure 16:
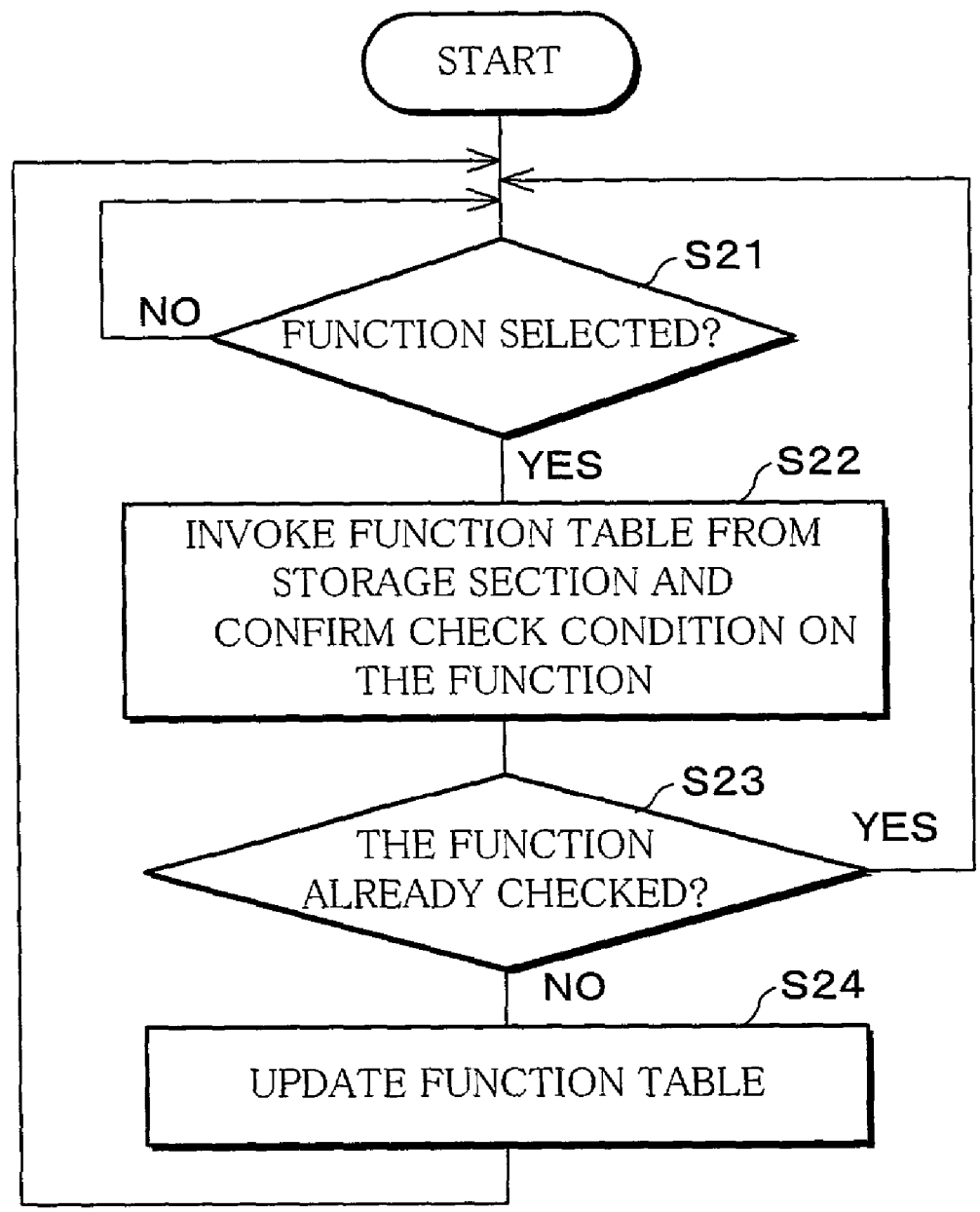
FIG. 16 is a flow chart showing another control by the client machine of the present invention.

FIGS. 15 and 16 show the foregoing processing steps performed by the client machine 1. Unlike the method shown in FIG. 15, the method in FIG. 16 shows that different processing steps are arranged to be taken depending on whether the selected function has already been checked or not: the function table is updated with overwriting and storing data only when the selected function has not been checked, and when the selected function has already been checked, a sequence goes back to step S21 without updating the function table, without overwriting and storing data.

This processing is performed so as to limit the number of times for writing data into the information recording medium constituting the storage section 14 such as a hard disk. With this arrangement, the resulting reduction of access operation and time can reduce the processing load on the control section 11, and improve the durability of the information recording medium constituting the storage section 14 and a magnetic head for writing data in the information recording medium, ensuring long-term reliability of the recorded data.

On the other hand, in the method shown in FIG. 15, data is overwritten and stored without any confirmation such as on whether the selected function has already been checked or not. Therefore, although the method shown in FIG. 15 is less durable in some degree than the method shown in FIG. 16 when recording data a plurality of times, it can perform high-speed processing as it does not require the operation of reading the function table.

That is, in the method shown in FIG. 15, as mentioned above, whether the function is selected or not is checked (S11), and when selected, the function table of the management file is invoked from the storage section 14, and the box for the function is checked (S12). Then, the function table is updated (S13), and a sequence goes back to S11.

In the method shown in FIG. 16, as mentioned above, whether the function is selected or not is checked (S21), and when selected, the function table is invoked from the storage section 14, and check condition of the box for the function is confirmed (S22). Whether the function has already been checked or not is examined (S23), and if not, the function table is updated (S24), and a sequence goes back to S21. When the function is found to be already checked in S23, a sequence directly goes back to S21.

Service Providing Process

The control section 21 of the terminal 2 of the service provider S obtains the foregoing information on the usage conditions of the functions of the software package used by the service receiver C, from the transmission section 27.

For example, in an example where the function table is in a condition shown in FIG. 12, the control section 21 receives 111, 130, and 300, the function codes for the functions which have "0" in their usage condition data boxes.

Since it is determined as the rule that the information received here is on the function codes for the functions not used in the client machine 1 of the service receiver C, the control section 21 judges whether there is an unused function or not from whether it receives a function code or not, and identifies the unused function from the content of the function code. In the foregoing example, the control section 21 judges that "Save in HTML", "Print Range", and "View" are the functions which are not used.

Then the control section 21 reads out an action corresponding to each of the unused functions from the action table stored in the storage section 24 (or a data base connected with a local network), and transmits the action to the service receiver C via the network 3.

More specifically, as shown in FIG. 13, an action corresponding to each function code is taken based on the function code. The action is managed by an action name which is in a one-to-one correspondence with the function code, and the content of the action is described in a box for showing the action content. The action content does not have to be in a one-to-one correspondence with the function code, and for example, a single action ("Transmit the content of file 231.") may be taken for a plurality of functions including "Cut" (code: 231) and "Copy" (code: 241) in the Edit function.

Besides, in this example, it is arranged to further refer to a file, and the content to be actually transmitted is described in the file. With such an arrangement, the correspondence between a function code and an action can be determined and modified based on FIG. 13, and the content to be transmitted can be modified by modifying the file. Therefore, this arrangement can enhance the flexibility when modifying the correspondence and the action content.

Although the content of the file should not be specified, it may be the one just notifying the present state, for example, "Save in HTML is not used", as shown in FIG. 14(a). This information makes the service receiver C aware of the unused function.

Or, the content of the file may be the one showing a new application method which was not found at the time of developing and shipping the software package.

Further, as shown in FIG. 14(b), the content of the file may be the one for making the function easier to use, such as "See page . . . in the manual to know how to use the Save in HTML function." This information can eliminate the possible question the service receiver C who tries to use the function would have in his mind, that is, how to use the function. Here, the content of the file may also be the one such as "See . . . in Help to know how to use the Save in HTML function."

Besides, as shown in FIG. 14(c), the content of the file may be the one making a suggestion such as "If you use the Save in HTML function, you can . . . ", and attracting attention of the service receiver C. This arrangement can clarify what the function can do, and is effective for the service receiver C who is interested in the function to some degree.

As long as the content of the file is such so-called text data, the amount of information is not excessive, so the data can be transmitted from the service provider S to the service receiver C via the network 3, under light load.

Incidentally, it may also be arranged that the information to be notified to the service receiver C is stored in the storage section 14 of the client machine 1 beforehand, likewise the management file, and only address information for reading out the information to be notified from the storage section 14 is transmitted from the service provider S to the service receiver C, and the control section 11 invokes the information from the storage section 14 in accordance with the address information. With this arrangement, the information transmitted from the service provider S to the service receiver C is only the address information, and thus the amount of the transmitted information can further be reduced.

However, since the content of the information to be provided should be stored in the storage section 14 beforehand, the amount of hardware such as a hard disk is increased. Further, a program such as for reading out and displaying corresponding information in accordance with the address information notified by the service provider S is additionally required, increasing the load on software. Besides, once the software package is shipped, the stored content cannot be changed, and thus it is difficult to keep providing the latest information. Considering these points, the foregoing method is superior.

Further, as shown in FIG. 14(d), the content of the file may be the one showing a specific example along with image information. This arrangement can show what the function can do more visually and specifically, so it is effective except for the service receiver C who does not have potential interest. Examples of the image information include, for example, in the case of the Photo function, comparison examples in which the image output prepared by using the automatic mode and the image output prepared by using the Photo mode are compared. The service provider S transmits text data along with the image information.

Figure 17:
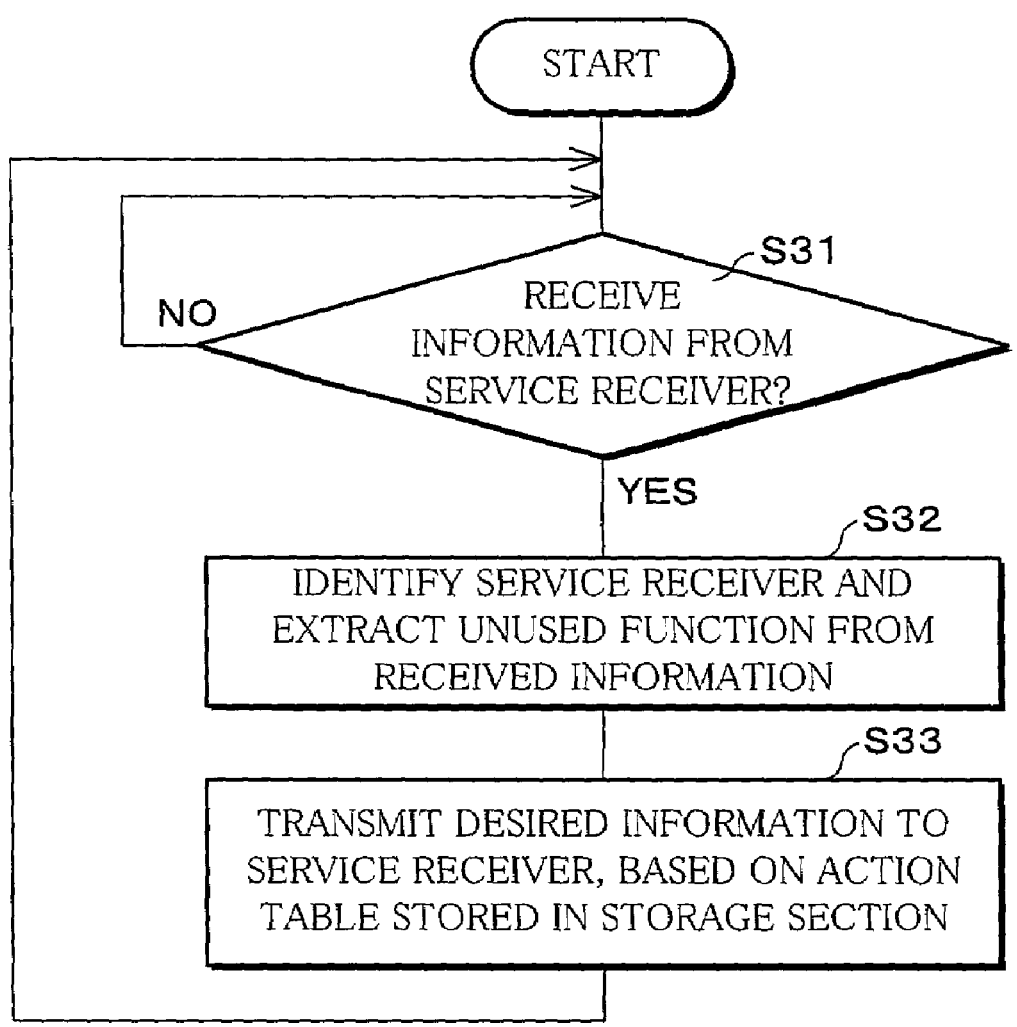
FIG. 17 is a flow chart showing a processing flow carried out by a terminal of a service provider.

FIG. 17 shows a processing flow performed by the terminal 2 of the service provider S. That is, when the terminal 2 receives information from the service receiver C (S31), the terminal 2 identifies the service receiver C and extracts unused functions (S32) from the received information. Then, the terminal 2 transmits desired information to the service receiver C, based on the action table stored in the storage section 24 (S33).

Service Receiving Process

The control section 11 of the client machine 1 of the service receiver C displays the transmitted information on the output section 13, or stores it in the storage section 14. Whether to store or display the information is judged by the control section 11. When the client machine 1 is standalone in the system of the service receiver C as shown in FIG. 2, it is necessary to display the information on the output section 13 of the client machine 1.

As for whether to store the received information, it is effective to store the received information when the information is transmitted from the service provider S only once, and there is a possibility that the information displayed on the output section 13 might not be surely conveyed to each operator of the service receiver C.

That is, there is a possibility that, even if the information is transmitted from the service provider S and surely received and displayed, the power of the client machine 1 is turned off by another operator (machine user) before the information is recognized by a person in charge of managing the system of the service receiver C. In such a case, by displaying the information stored in the storage section 14 again when the power of the client machine 1 is turned on again, the information can surely be conveyed to the person in charge of managing the system of the service receiver C.

Incidentally, whether or not the service receiver C uses the proposed function in accordance with the displayed information totally depends on the intention of the service receiver C, and the present invention does not ensure that the service receiver C uses the unused functions. However, the object of the present invention is to increase the number of times the available functions are actually used, in such a manner that the service provider S detects functions forgotten by the service receiver C, proposes to use the forgotten functions, and gives a chance or a motivation that the service receiver C effectively uses the functions originally available in the software package.

Figure 18:
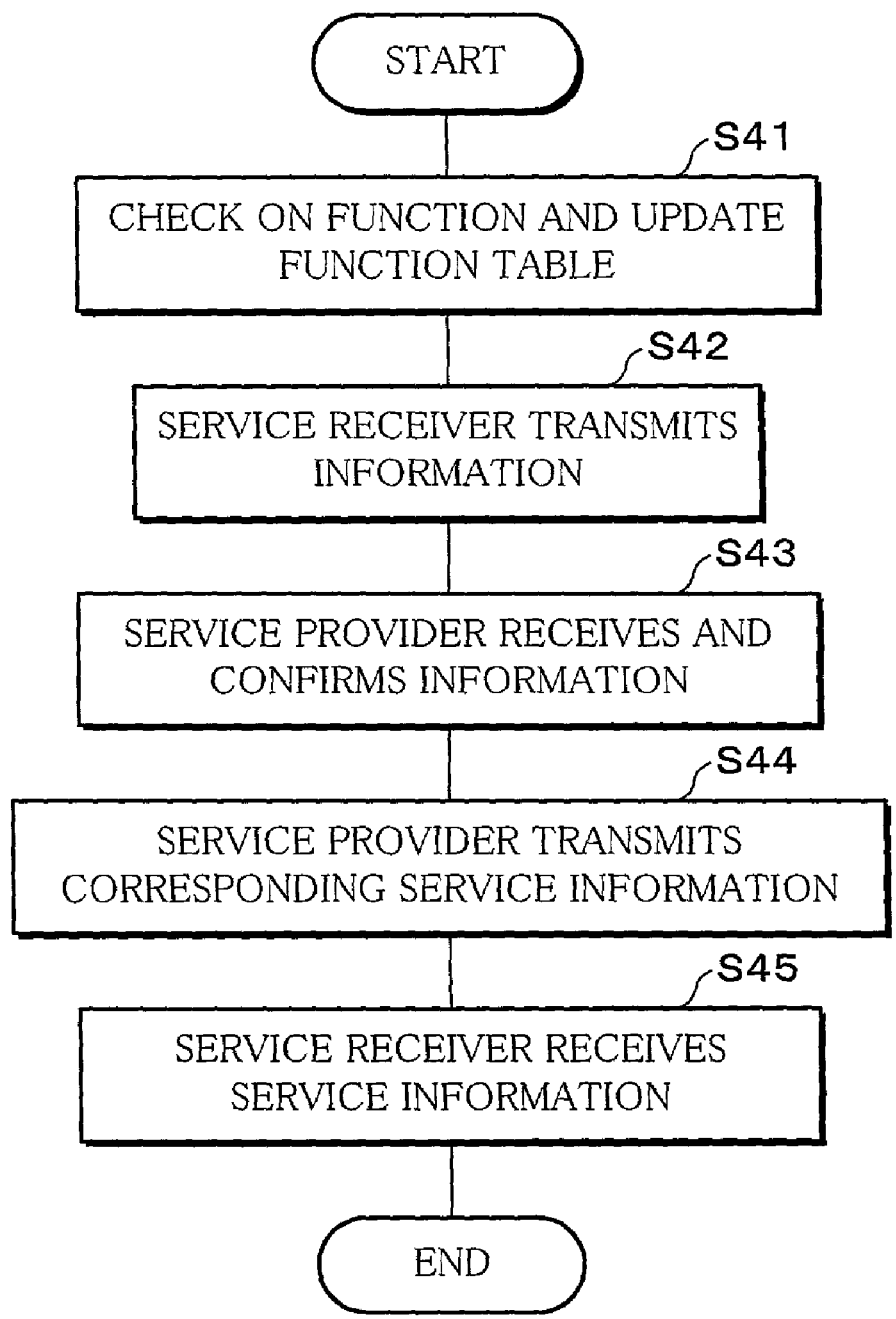
FIG. 18 is a flow chart showing an example of a processing flow carried out by the overall network system.

FIG. 18 shows a processing flow as an overall network system, in accordance with the foregoing description.

That is, in step S41, the control section 11 of the client machine 1 monitors an input signal from the input section 12, and in the case where a function is used for the first time in the software package which is being activated, the control section 11 checks the corresponding box for the function in the function table of the management file already stored in the storage section 14. Specifically, the control section 11 changes "0" already inputted in the usage condition data box as the default value to "1".

Next, in step S42, the control section 11 of the client machine 1 gives an instruction to the transmission section 17 to transmit the information on the function checked in the function table to the terminal 2. At the time of transmission, the above-mentioned function code which is the information to identify the function is used. As necessary, the information to be transmitted is transmitted in cipher.

That is, in step S43, the client machine 1 of the service receiver C establishes a network with the terminal 2, and transmits the information to the terminal 2 of the service provider S. This processing is not required when the client machine 1 and the terminal 2 are always connected. Here, by transmitting the information along with the service receiver ID number, which is assigned to each service receiver C, the terminal 2 can identify the service receiver C who transmitted the information. The service receiver ID number is prepared by the service provider S and given to each service receiver C. The number is specific to each service receiver C, and one service receiver ID number, for example, 000125, is assigned to one service receiver C.

Next, in step S44, the terminal 2 receives the information from the client machine 1. Further, when the system of the service receiver C is structured to have a plurality of the client machines 1, the terminal 2 receives the information from the respective client machines 1. Here, each client machine 1 transmits ID information specifying the software package installed in the client machine 1, and information identifying the client machine 1, and the terminal 2 stores the two types of information as a pair. With this arrangement, it becomes possible to specify from which client machine 1 in the system of the service receiver C the information received by the terminal 2 is transmitted.

Based on the received information, the control section 21 of the terminal 2 identifies the service receiver C, and confirms an unused function.

The service receiver C is identified by detecting the service receiver ID number, and the unused function is confirmed based on the received function code, and the processing to be taken for the unused function is specified according to the action table stored in the storage section 24 or a data base terminal (not shown) which is connected to the terminal 2 via a local network.

The action specified by the foregoing step is taken, and, in the example shown in FIGS. 14(a) through 14(d), the content stored in the file xxx is transmitted to the client machine 1. Examples of the transmitted information include text data only, or data in which text data and image data are mixed.

Next, in step S45, the client machine 1 receives the information including service information from the terminal 2 via the network 3, and the information is displayed on the output section 13 of the client machine 1.

Second Embodiment

Figure 21:
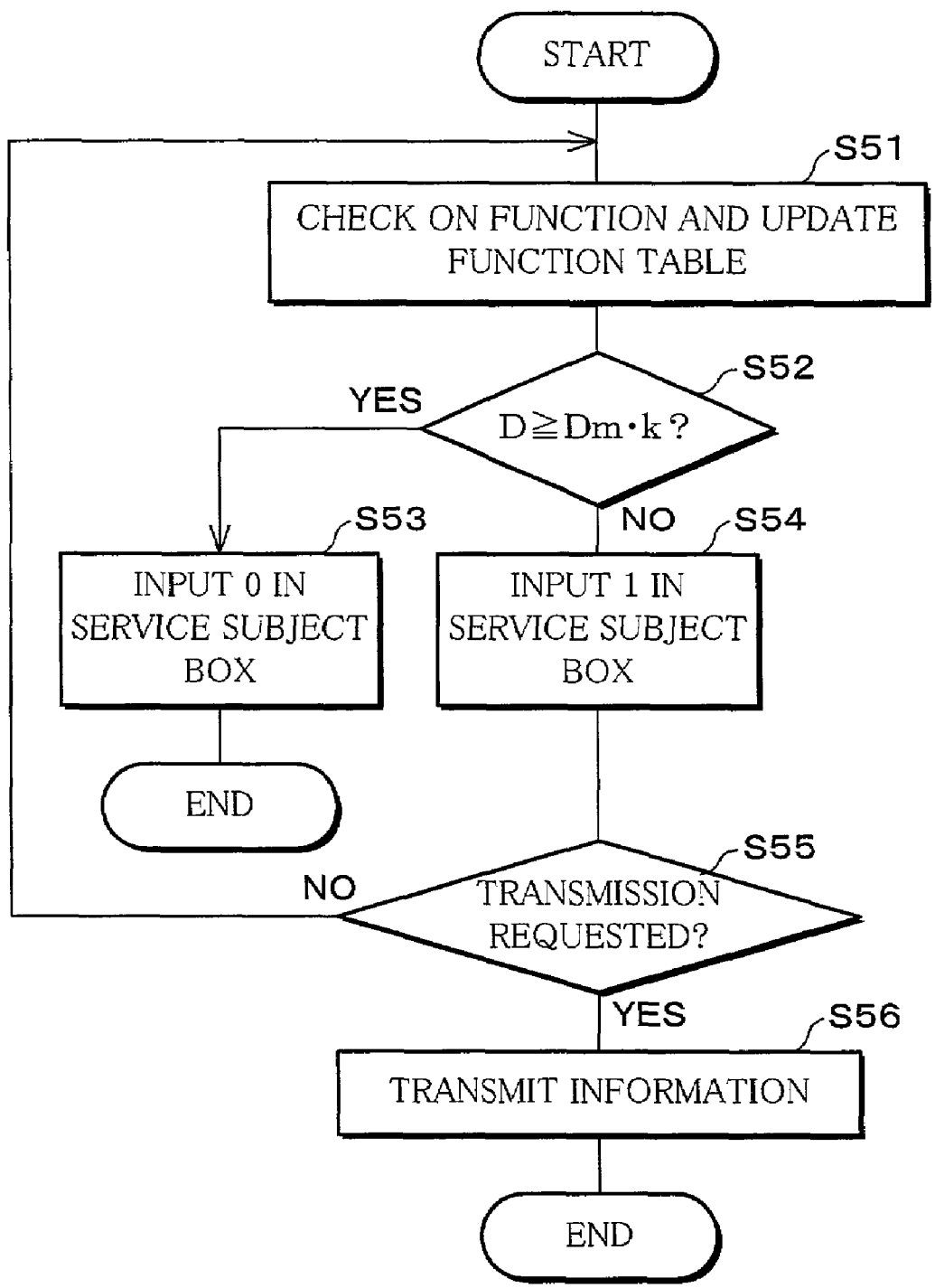
FIG. 21 is a flow chart showing still another control by the client machine of the present invention.

Referring to FIGS. 19 to 21, the following description will describe another embodiment of the present invention. The members having the same structure (function) as those in the above-mentioned embodiment will be designated by the same reference numerals and their description will be omitted.

In the first embodiment, the information recorded in the usage condition data boxes in the function table of the management file is only "0" and "1", that is, whether the function is used or not.

On the other hand, in the present embodiment, the usage condition data boxes are changed to boxes for showing data on the number of usage so as to store the number of times the respective functions are used, which is a difference from the first embodiment.

FIG. 19 shows an example of the function table. This table indicates that the Save in HTML function and the Copy function are used once and 356 times, respectively. While both functions are judged as used in the first embodiment, the service management method of the present embodiment is characterized by judging the Save in HTML function as not being used effectively, and providing service information on the function.

That is, the service management method of the present embodiment operates so as to provide service information or not according to data D on the number of usage (hereinafter referred to as data D). For example, the data D of a function is compared with the data D of the function which is used most, that is, a maximum value Dm of the data D (for example, 356 for the Copy function), and unless the data D reaches a certain level, the function is judged as not used.

The following description will be given based on a flow chart shown in FIG. 21.

First, in step S51, it is detected that a function is used, and the data D in the corresponding box for showing data on the number of usage for the function in the function table is incremented, that is, D=D+1. Besides, the content of the function table is updated.

Next, in step S52, the data Dm, which is the maximum value of the data D, is read out from the function table. In the example shown in FIG. 19, Dm=356. A coefficient k for setting a reference value is multiplied to the Dm. However, k<1, and for example, it is set as k=0.1. When there is a fraction in an obtained value, the fractional portion of the value is rounded off. When k=0.1, the value Dm·K becomes 35. Then, the incremented data D and the value Dm·K are compared.

When $D \geq Dm \cdot K$, the function is judged as fully used, and excluded from the subject of the service of the present invention for promoting the use of unused functions, and the processing is completed.

When $D < Dm \cdot K$, the function is judged as not fully used, and becomes the subject of the service of the present invention.

For example, as shown in FIG. 20, service subject boxes for showing whether the respective functions are the subject of the service or not are newly provided to the function table, and two-value data showing whether service is required (data="1") or not (data="0") are stored there. That is, when $D \geq Dm \cdot K$, "0" is inputted to the corresponding service subject box (S53), and when $D < Dm \cdot K$, "1" is inputted to the corresponding service subject box (S54).

Next, in step S55, it is judged whether there is a request for transmitting information to the terminal 2. If there is, a sequence goes to step S56, and if not, a sequence goes back to step S51.

Next, in step S56, the control section 11 searches for the function for which service is required (data="1") by looking into the service subject boxes in the function table, and transmits information on the function having the data "1" in the service subject box, including the function code, to the terminal 2.

Third Embodiment

Figure 22:
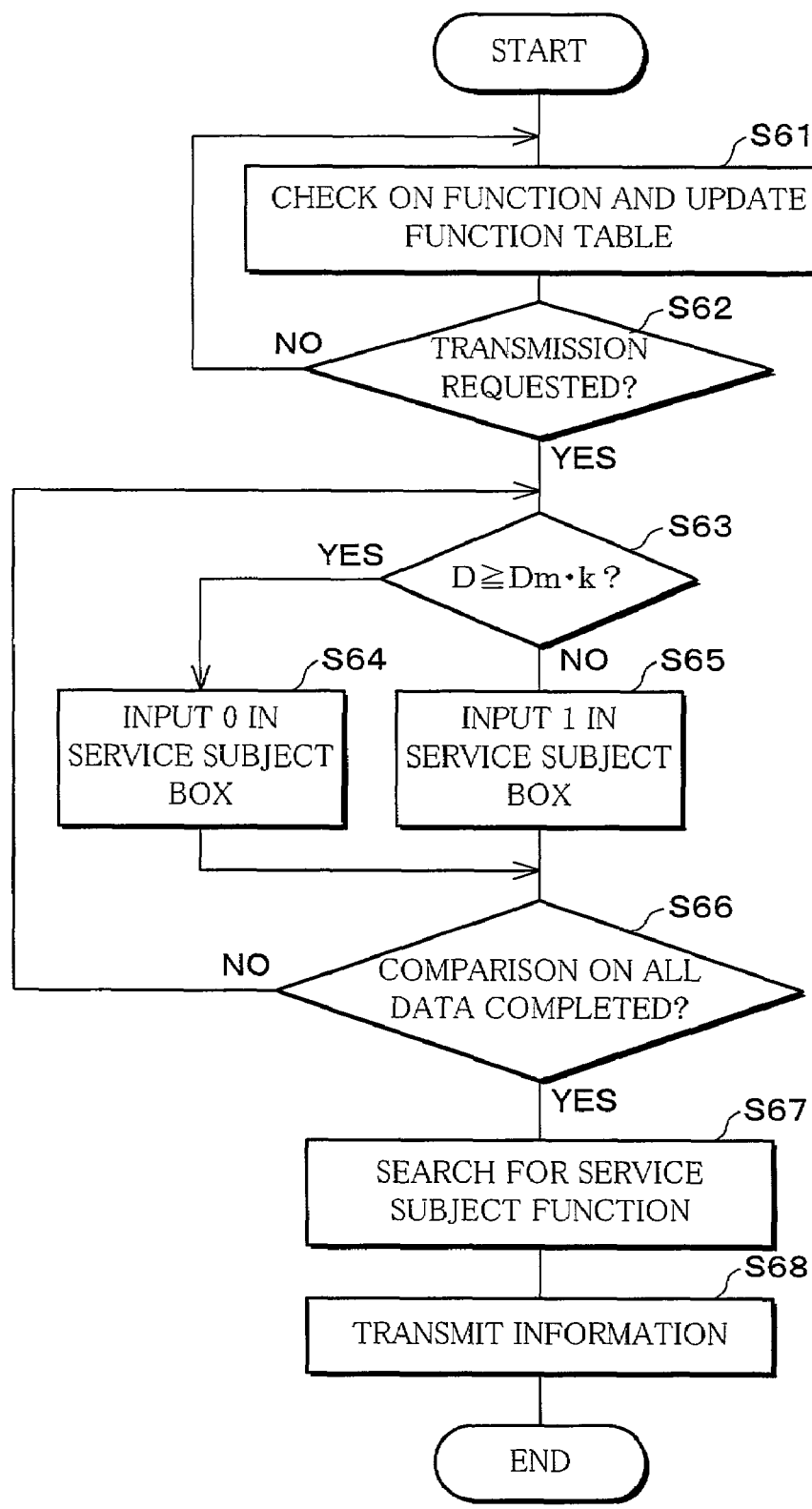
FIG. 22 is a flow chart showing still another control by the client machine of the present invention.

Referring to FIGS. 19, 20, and 22, the following description will describe another embodiment of the present invention. The members having the same structure (function) as those in the above-mentioned embodiments will be designated by the same reference numerals and their description will be omitted.

In the second embodiment, when an operator uses a function and the control section 11 detects the usage of the function, processing to determine whether or not to provide service for the function is carried out, and the processing result is recorded in the service subject boxes. Therefore, the processing required when the usage of the function is detected is steps S51 to S54, and the detection of the function for which service is required is performed in step S56. That is, the processing required when transmitting information to the terminal 2 is only step S56.

On the contrary, however, when using a software package in normal times, the processing from step S51 to step S54 is always required, which causes a problem of increasing the processing load on the control section 11.

Consequently, the present embodiment proposes a method for reducing the processing load while using a software package, although the processing required for transmitting information to the terminal 2 is increased.

The explanation will be given below, based on the flow chart shown in FIG. 22.

First, in step S61, it is detected that a function is used, and the data D in the corresponding box for showing data on the number of usage for the function in the function table is incremented, that is, D=D+1. Besides, the content of the function table is updated. Unless there is a request for transmitting information to the terminal 2, this step is repeated.

Next, in step S62, whether there is a request for transmitting information to the terminal 2 is judged. If there is, a sequence goes to step S63.

Next, in step S63, the Dm, which is the maximum value of the data D, is read out from the function table. In the example shown in FIG. 19, Dm=356. A coefficient k for setting a reference value is multiplied to the Dm. However, k<1, and for example, it is set as k=0.1. When there is a fraction in an obtained value, the fractional portion of the value is rounded off. When k=0.1, the value $Dm \cdot K$ becomes 35. Then, all the data D are compared with the value $Dm \cdot K$.

When $D \geq Dm \cdot K$, the function is judged as fully used, and for example, "0" (service is not required) is inputted to the service subject box shown in FIG. 20 (S64). When $D < Dm \cdot K$, the function is judged as not fully used, and becomes the subject of the service of the present invention. For example, "1" (service is required) is inputted to the service subject box shown in FIG. 20 (S65).

When the comparison of the data D and the value $Dm \cdot K$ on all the functions is completed (S66), the control section 11 searches for the function for which service is required (data="1") by looking into the service subject boxes in the function table (S67), and transmits information on the function having the data "1" in the service subject box, including the function code, to the terminal 2 (S68).

Fourth Embodiment

Referring to FIGS. 13, 19, 20, and 23, the following description will describe another embodiment of the present invention. The members having the same structure (function) as those in the above-mentioned embodiments will be designated by the same reference numerals and their description will be omitted.

In the first through the third embodiments, all the judgments are made by the client machine 1 of the service receiver C, but the judgment such as on whether a function is used or not may be made by the terminal 2 of the service provider S.

Figure 23:
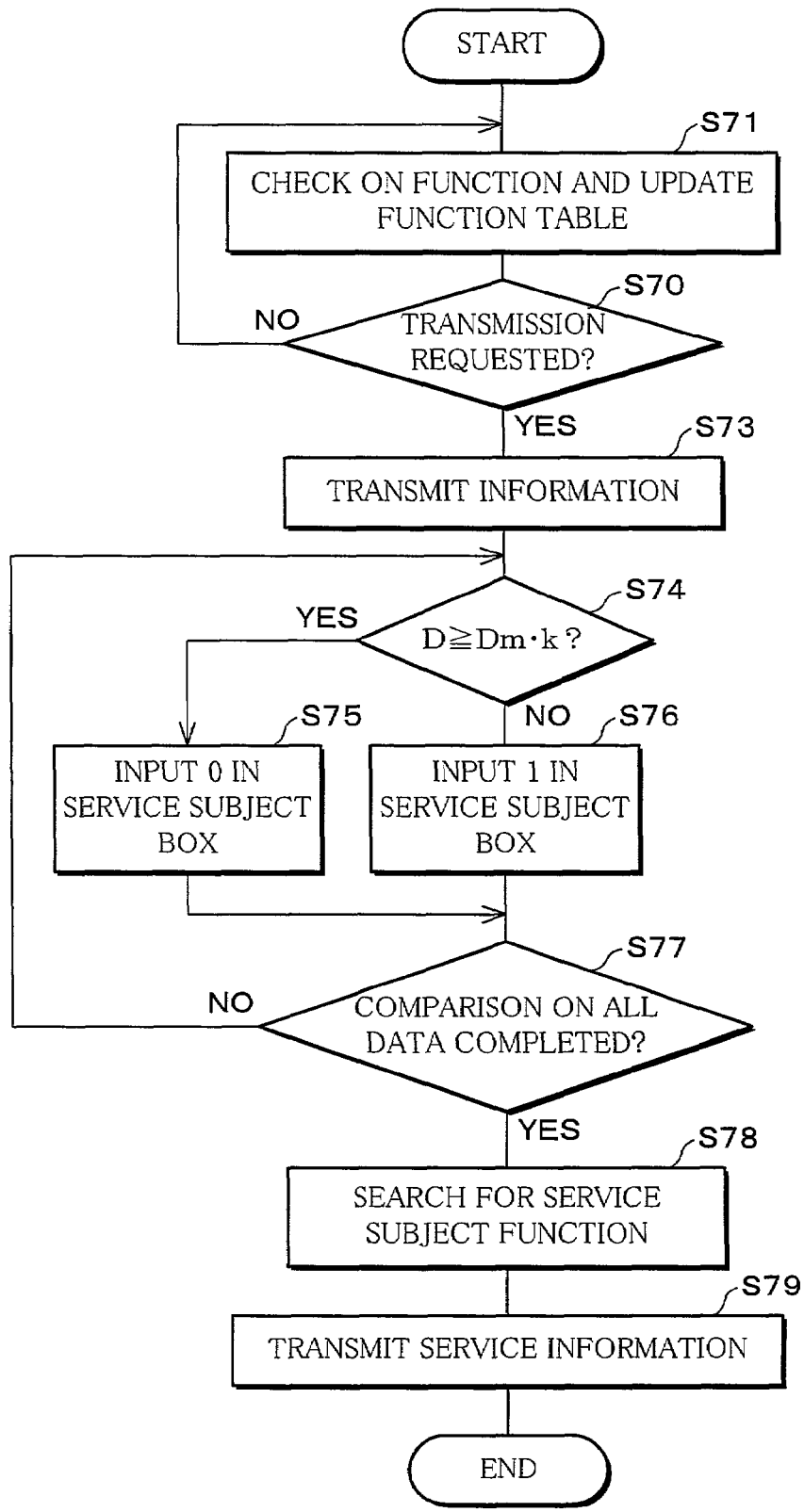
FIG. 23 is a flow chart showing another example of the processing flow carried out by the overall network system.

The explanation will be given below, based on the flow chart shown in FIG. 23.

First, in step S71, the control section 11 of the client machine 1 detects that a function is used, and the data D in the corresponding box for showing data on the number of usage for the function in the function table of the management file stored in the storage section 14 is incremented, that is, D=D+1. Besides, the content of the function table is updated.

Next, in step S72, whether there is a request for transmitting information to the terminal 2 is judged. If there is, a sequence goes to step S73, and if not, step S71 is repeated.

Next, in step S73, the content of the function table shown in FIG. 20 is transmitted to the terminal 2. As necessary, the service receiver ID number which can identify the service receiver C or the product ID number is also transmitted.

Next, in step S74, the control section 21 of the terminal 2 identifies the service receiver C, and reads out the Dm, which is the maximum value of the data D shown in the boxes for showing the number of usage, from the received function table. In the example shown in FIG. 19, Dm=356. A coefficient k for setting a reference value is multiplied to the Dm. However, k<1, and for example, it is set as k=0.1. When there is a fraction in an obtained value, the fractional portion of the value is rounded off. When k=0.1, the value $Dm \cdot K$ becomes 35. Then, all the data D are compared with the value $Dm \cdot K$.

When $D \geq Dm \cdot K$, the function is judged as fully used, and for example, "0" (service is not required) is inputted to the service subject box shown in FIG. 20 (S75). When $D < Dm \cdot K$, the function is judged as not fully used, and for example, "1" (service is required) is inputted to the service subject box shown in FIG. 20 (S76), and the function becomes the subject of the service of the present invention.

When the comparison of the data D and the value Dm·K on all the functions is completed (S77), the control section 21 searches for the function for which service is required (data="1") by looking into the service subject boxes in the function table (S78), and makes a response, that is, transmits service information to the client machine 1 according to the action table shown in FIG. 13 (S79).

Incidentally, in the foregoing explanations, when judging a function as not fully used, the judgment was made based on the comparison between the number of times the function is used and the value obtained by multiplying a coefficient to the maximum number of times a function among the available functions is used. However, the present invention is not limited to this, and a function may be judged as not fully used based on the average number of times the available functions are used, or by setting an absolute value as a reference value (for example, five times) and comparing the reference value with the number of times the function is used.

As mentioned above, it is preferable to directly inform the service receiver C of unused functions and suggest the usage of the unused functions, as notification and promotion processing. Although it is also possible to display a URL address on the client machine 1 as an access point for obtaining service information, based on the premise that the service receiver C uses WWW (World Wide Web), etc., since the service information is not provided unless the service receiver C clicks the address in such a case, there is a problem in the certainty that the service receiver C has access to the information. In such a case, it is at least necessary to disclose summarized information when providing information to the service receiver C, and it is preferable to prepare detailed information on a page specified by the URL address as a complement.

Incidentally, the service provided by the present invention is arranged so as to be automatically notified to the service receiver C by the service provider S. However, such automatic notification is not always required in the case where the present service is fully recognized by the service receiver C, and the service may be provided in a structure such that a button for confirming the usage conditions of the functions is provided on a display screen displayed when a software package is being activated, and the usage conditions are displayed when an operator of the service receiver C clicks the button.

Besides, in the case where the system of the service receiver C is not connected with a network and the client machine 1 is used as a standalone device, the content to be notified is displayed in a part of the output section 13 where the screen for the software package is displayed. With this structure, service can be provided to the service receiver C even in a condition which is not under a network environment.

That is, in this case, the function table is updated in accordance with the flow chart shown in FIG. 15 or 16, then the service management program incorporated into the software package in the standalone client machine 1 or installed into the client machine 1 along with the software package plays a role as the service provider S, to which information is transmitted in FIG. 17, 18, 21, 22, or 23, and receives the information. The above-mentioned action table is also prepared beforehand in the service management program.

Then, based on the action table, messages on the used or unused functions as shown in FIGS. 14(a) through 14(d), or the function tables showing the usage conditions of the functions as shown in FIGS. 10 to 12, are outputted (displayed) on the output section 13 such as a CRT, a liquid crystal display, and a printer, etc. With this structure, the service receiver C can receive service on the unused functions of the software package, even in a condition which is not under a network environment.

Besides, under a network environment, after receiving the information on the usage conditions of the software package used by the service receiver C from the transmission section 27 of the terminal 2, a person in charge of developing the service subject software package as the service provider S can carry out the following processing instead of the processing to transmit the action corresponding to each unused function from the terminal 2 to the service receiver C, or along with the processing.

That is, since which function is used less can be judged from the obtained information, such a function can be regarded as having less actual utility value for users. Thus, when planning a next version of the software package, it becomes possible to take measures such as examining whether to delete the function to avoid bloating and cost increase of the software package, or improve the function to be easier to use so as to enhance its utility value.

As has been discussed, a service management method of the present invention, which is a service management method managing an application program (a software package) made up of a combination of a plurality of functions by a computer, is structured so as to include the steps of checking usage conditions of the plurality of the functions, and making the computer carry out notification and promotion processing to promote a user to use a function which is used less than a predetermined number of times.

With this structure, it is possible to motivate the user to use a function which the user does not notice and seldom uses, and to make the user aware of useful function incorporated into the application program the user uses. Therefore, it becomes possible to effectively provide the user with a function having high utility value for the user.

In the service management method of the present invention, it is preferable to set the predetermined number of times as not less than twice in the foregoing structure.

With this structure, whether a function is used less than the predetermined number of times or not is judged based on the predetermined number of times which is not less than twice. Therefore, this structure can prevent a function which is regarded as used in form although it is not intended to be used, in a case such that the user clicks a button, etc., by mistake and the function is judged to be used once, from being excluded from the subject of the usage promotion, obtaining more accurate information on the usage conditions of the functions. Consequently, in addition to the effect by the foregoing structure, it becomes possible to judge a function having high utility value for the user more accurately, and to notify the user of the function more effectively.

The service management method of the present invention, which is a service management method managing an application program made up of a combination of a plurality of functions by a computer, is structured so as to include the steps of checking usage conditions of the plurality of the functions and making the computer carry out processing to transmit the checking result to a service provider providing the application program to a user.

With this structure, the service provider (manufacturer) can obtain information on which function has already been used and which function has never or seldom been used, and take more flexible measures according to the actual usage conditions. Consequently, in addition to the effect by the foregoing structure, it becomes possible to provide the user with a function having high utility value for the user more effectively.

In the service management method of the present invention, it is preferable to receive the content of the notification and promotion processing to promote a user to use a function which is used less than a predetermined number of times, which corresponds to the usage conditions of the functions transmitted to the service provider, from the service provider, and to make the computer carry out the notification and promotion processing based on the content.

With this structure, upon the transmission of the usage conditions of the functions to the service provider, the notification and promotion processing is transmitted from the service provider in reverse, and the computer on the user's side carries out the notification and promotion processing based on the content of the notification and promotion processing.

Therefore, the service provider can provide the service receiver (user) using the application program with service to transmit a message for promoting the use of the function via a network, etc., based on the obtained information on the usage conditions, with taking flexible measures to changes, etc., in the computer environment as occasion arises. Consequently, in addition to the effect by the foregoing structure, it becomes possible to provide the user with a function having high utility value for the user more effectively.

Besides, a processing program which allows the service provider to make a response for providing service can be placed in the terminal of the service provider, aside from the program for executing the service management method of the present invention. Therefore, this structure can restrain the increase in the scale of the program for executing the service management method of the present invention required on the side of the service receiver.

In addition, the content of the service to be provided can be prepared on the side of the service provider without limitation, and updated in real time. Consequently, this structure can prevent information from becoming out of date, and provide the service receiver with the latest information.

Further, the service management method of the present invention, which is a service management method managing a software package made up of a combination of a plurality of functions including a function for carrying out processing to transmit/receive information via a network, may be structured so as to receive usage conditions of the functions of the software package from a device in which the software package is installed via the network, and to make a computer carry out processing to transmit a message for promoting the use of a function which is indicated in the usage conditions as a function used less than a predetermined number of times, to the device.

With this structure, concerning a function which is indicated in the usage conditions of the functions of the software package as a function used less than a predetermined number of times, a message for promoting the use of the function is transmitted to the device via the network. That is, when the usage conditions contain information on an unused function or on a seldom used function, a message in accordance with the function is transmitted to the device.

Therefore, the service provider such as a manufacturer can easily and surely obtain the usage conditions of the software package used by the service receiver without necessitating special steps on the part of the service receiver, and based on the obtained information, the service provider can inform the service receiver of the unused function and an explanation on its application, and make a suggestion to use the unused function, etc.

As a result, the service receiver can obtain a chance to make the most of the functions available in the software package, and he can effectively use the software package. Consequently, the service receiver can obtain new feeling of satisfaction by newly using the functions.

Besides, since the service provider can obtain information on which function prepared by the manufacturer is effectively used and which function is not used, he can reflect the result to the product specification of a next version. Consequently, the service provider can effectively provide the user with a function having high utility value for the user.

Further, the service management method of the present invention, which is a service management method managing an application program made up of a combination of a plurality of functions by a computer, may be structured so as to make the computer carry out:

a step for detecting that a specific function is selected or performed; and a step for updating a management file which records usage conditions of the plurality of the functions so as to distinguish the detected function from an undetected function.

According to the foregoing structure, in recording the usage conditions of the plurality of the functions in the management file, the management file is updated so as to distinguish the detected function from the undetected function. Thus, the management file can be used for the notification and promotion processing promoting the use of the function which is used less than a predetermined number of times, as mentioned above. Consequently, it becomes possible to effectively provide the user with a function having high utility value for the user.

That is, since information on a used function and an unused function can be obtained from the management file, the service provider can provide the service receiver using the software package with service based on the obtained information.

The service management method of the present invention, which is a service management method managing an application program made up of a combination of a plurality of functions by a computer, is characterized by making the computer carry out:

a step for detecting that a specific function is selected or performed; and a step for writing the number of detection of the detected function in a management file which records usage conditions of the plurality of the functions.

According to the foregoing structure, in recording the usage conditions of the plurality of the functions in the management file, the number of detection of the detected function is written in the management file. Thus, the management file can be used for the notification and promotion processing promoting the use of the function which is used less than a predetermined number of times, as mentioned above. Consequently, it becomes possible to effectively provide the user with a function having high utility value for the user.

Besides, in addition to the foregoing effect, if the predetermined number of times is set appropriately, it prevents the case such that the user clicks a button by mistake from being counted as used, obtaining more accurate information on an unused function. Therefore, more appropriate service can be provided.

A service management program of the present invention is a program for making a computer carry out either of the foregoing service management methods, and an information recording medium of the present invention is a computer-readable information recording medium recording the service management program.

With this structure, by loading the service management program of the present invention from the information recording medium of the present invention or via a network, etc., to the computer, it becomes possible to carry out the service management method by using the computer.

Besides, the service management method of the present invention may be structured so as to include a step for displaying data which includes at least either of data on a used function and data on an unused function described in the management file, on a screen of the software package.

With this structure, even in a usage condition which is not connected to a network, it becomes possible to inform the service receiver of the unused function and to actively motivate and suggest the service receiver to use the unused function.

Besides, the service management method of the present invention may be structured so as to include a step for transmitting data which includes at least either data on a used function or data on an unused function described in the management file.

With this structure, since it becomes possible, for example, to provide the service provider with the data, the service provider can make a more flexible response. Specifically, since a processing program for making a response can be placed in the terminal of the service provider, aside from the software package, this structure can restrain the increase in the scale of the software package in accordance with the present invention required on the side of the service receiver. In addition, since the content of the service to be provided can be prepared on the side of the service provider without limitation, and updated in real time, this structure can prevent information from becoming out of date, and provide the service receiver with the latest information.

Further, the service management method of the present invention may be structured so as to include:

a step for obtaining usage conditions of the functions of the software package from a device in which the software package is installed via the network; and a step for transmitting a message in accordance with a function to the device, when the usage conditions contain information on an unused function or on a seldom used function.

With this structure, if the software package has a network function, the service provider such as a manufacturer can easily and surely obtain the usage conditions of the software package used by the service receiver without necessitating special steps on the part of the service receiver, and based on the information, the service provider can inform the service receiver of the unused function and an explanation on its application, and make a suggestion to use the unused function, etc. As a result, the service receiver can obtain a chance to make the most of the functions available in the software package, and he can effectively use the software package. Consequently, the service receiver can obtain new feeling of satisfaction by newly using the functions. Besides, since the service provider can obtain information on which function prepared by the manufacturer is effectively used and which function is not used, he can reflect the result to the product specification of a next version.

In addition, such service is more effective when it is provided within a certain period of time after the user purchases a software package. This is because the user has great interest in the software package during the period, and especially, unlike a manufacturer-oriented suggestion which would require additional payment, a suggestion is made on a function which is available in the already purchased software package but has not been used, so the user easily listen to the suggestion from the service provider. On the contrary, after a certain period of time, the user's interest gradually diminishes, and if efforts are required to freely use a new function, the possibility that the user listens to the suggestion becomes further lower.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A service management method managing an application program made up of a combination of a plurality of functions by a computer, making said computer carry out the steps of:
   detecting that a specific function is selected or performed; and
   updating a management file which records usage conditions of said plurality of the functions so as to distinguish said detected function from an undetected function,
   wherein, the functions are grouped into at least a first level and a second level, at least one function in the first level being associated with at least one function in the second level, and
   the at least one function in the first level is identified as used only if all functions in the second level that are associated with the at least one function are identified as used.

2. The service management method as set forth in claim 1, further making said computer carry out the step of:
   displaying data which includes at least either of data on a used function and data on an unused function described in said management file, on an activation screen of said application program.

3. The service management method as set forth in claim 1, further making said computer carry out the step of:
   transmitting data which includes at least either of data on a used function and data on an unused function described in said management file.

4. A service management method managing an application program made up of a combination of a plurality of functions by a computer, making said computer carry out the steps of:
   detecting that a specific function is selected or performed; and
   writing number of detection of said detected function in a management file which records usage conditions of said plurality of the functions, wherein
   the functions are grouped into at least a first level and a second level, at least one function in the first level being associated with at least one function in the second level, and
   the at least one function in the first level is identified as used only if each function in the second level that is associated with the at least one function is detected a predetermined number of times.

5. The service management method as set forth in claim 4, further making said computer carry out the step of:

displaying data which includes at least either of data on a used function and data on an unused function described in said management file, on an activation screen of said application program.

6. The service management method as set forth in claim 4, further making said computer carry out the step of:
transmitting data which includes at least either of data on a used function and data on an unused function described in said management file.

7. A computer-readable information recording medium recording a service management program for managing an application program made up of a combination of a plurality of functions by a computer, recording said service management program provided for making said computer carry out the steps of:
detecting that a specific function is selected or performed; and
updating a management file which records usage conditions of said plurality of the functions so as to distinguish said detected function from an undetected function,
wherein, the functions are grouped into at least a first level and a second level, at least one function in the first level being associated with at least one function in the second level, and
the at least one function in the first level is identified as used only if all functions in the second level that are associated with the at least one function are identified as used.

8. A computer-readable information recording medium recording a service management program for managing an application program made up of a combination of a plurality of functions by a computer, recording said service management program provided for making said computer carry out the steps of:
detecting that a specific function is selected or performed; and
writing number of detection of said detected function in a management file which records usage conditions of said plurality of the functions, wherein
the functions are grouped into at least a first level and a second level, at least one function in the first level being associated with at least one function in the second level, and
the at least one function in the first level is identified as used only if each function in the second level that is associated with the at least one function is detected a predetermined number of times.

9. A service management method managing an application program made up of a combination of a plurality of functions by a computer, the functions being grouped into a plurality of function groups such that each function group either (a) contains at least one function group or (b) corresponds to a function, and including a function group for carrying out processing to transmit/receive information via a network, the service management method making the computer carry out the steps of:
detecting that a specific function group is selected or performed; and
updating a management file which records usage conditions of said plurality of the function groups so as to distinguish said detected function group from an undetected function group,
wherein, the function groups are grouped into at least a first level and a second level, at least one function group in the first level being associated with at least one function group in the second level, and
the at least one function group in the first level is identified as used only if all function groups in the second level that are associated with the at least one function group are identified as used.

* * * * *